US010732579B2

(12) United States Patent
Vincent et al.

(10) Patent No.: US 10,732,579 B2
(45) Date of Patent: Aug. 4, 2020

(54) APPARATUS AND METHOD FOR ASSEMBLING, MEASURING, AND MONITORING INTEGRITY OF MECHANICAL PIPE JOINTS

(71) Applicants: Larry W. Vincent, The Woodlands, TX (US); Darrell L. Vincent, Oklahoma City, OK (US)

(72) Inventors: Larry W. Vincent, The Woodlands, TX (US); Darrell L. Vincent, Oklahoma City, OK (US)

(*) Notice: Subject to any disclaimer, the term of this patent is extended or adjusted under 35 U.S.C. 154(b) by 957 days.

(21) Appl. No.: 14/880,618

(22) Filed: Oct. 12, 2015

(65) Prior Publication Data
US 2016/0101491 A1 Apr. 14, 2016

Related U.S. Application Data

(60) Provisional application No. 62/062,944, filed on Oct. 12, 2014.

(51) Int. Cl.
*G01M 3/24* (2006.01)
*G01M 3/28* (2006.01)
(Continued)

(52) U.S. Cl.
CPC ............ *G05B 11/36* (2013.01); *B21D 41/026* (2013.01); *B21D 41/04* (2013.01); *B23P 19/027* (2013.01);
(Continued)

(58) Field of Classification Search
CPC ......... B30B 15/16; G05B 11/36; G05B 15/02; G05B 2219/31033; G05B 2219/45233;
(Continued)

(56) References Cited

U.S. PATENT DOCUMENTS 1,886,275 A 11/1932 Nell
2,884,745 A 5/1959 Fritze et al.
(Continued)

FOREIGN PATENT DOCUMENTS

CA 2874173 A1 12/2013
CN 101513778 A * 8/2009
(Continued)

OTHER PUBLICATIONS

Google Machine Translation of DE19814202A1, https://patents.google.com/patent/DE19814202A1/en?oq=DE+19814202+A1[Aug. 15, 2018 2:09:24 PM] (Year: 2018).*
(Continued)

*Primary Examiner* — Alexander Satanovsky
*Assistant Examiner* — Mark I Crohn
(74) *Attorney, Agent, or Firm* — Whitaker Chalk Swindle & Schwartz PLLC; Stephen Mosher

(57) ABSTRACT

Processes and systems for preparing pipe for machine processing to form pin and box ends for assembly into pipelines using mechanical press-fit pipe joints that are fully measured and documented during both manufacturing and assembly. Installed pipelines include pipeline data monitoring systems coupled to a pipeline data management center for receiving, archiving, and analysis of the data records to aid in administration, operation and management, and troubleshooting of pipelines.

17 Claims, 14 Drawing Sheets

(51) Int. Cl.
| | |
|---|---|
| *B23P 19/027* | (2006.01) |
| *G05B 11/36* | (2006.01) |
| *B21D 41/02* | (2006.01) |
| *B21D 41/04* | (2006.01) |
| *F16L 58/04* | (2006.01) |
| *G05B 19/19* | (2006.01) |
| *G06K 1/12* | (2006.01) |
| *F16L 58/02* | (2006.01) |
| *G05B 15/02* | (2006.01) |
| *G06F 30/00* | (2020.01) |
| *G06F 113/14* | (2020.01) |

(52) U.S. Cl.
CPC ............... *F16L 58/02* (2013.01); *F16L 58/04* (2013.01); *G01M 3/243* (2013.01); *G01M 3/2815* (2013.01); *G05B 15/02* (2013.01); *G05B 19/19* (2013.01); *G06K 1/121* (2013.01); *F16L 2201/10* (2013.01); *F16L 2201/30* (2013.01); *F16L 2201/60* (2013.01); *G05B 2219/31033* (2013.01); *G05B 2219/35178* (2013.01); *G05B 2219/45233* (2013.01); *G06F 30/00* (2020.01); *G06F 2113/14* (2020.01)

(58) Field of Classification Search
CPC .......... G05B 2219/35178; G05B 19/19; G06K 1/121; G01M 3/243; G01M 3/2815; B21D 41/04; B21D 41/026; B23P 19/027; G06F 2113/14; G06F 30/00; F16L 2201/60; F16L 2201/30; F16L 2201/10; F16L 58/02; F16L 58/04
See application file for complete search history.

(56) References Cited

U.S. PATENT DOCUMENTS

| | | |
|---|---|---|
| 3,208,136 A | 9/1965 | Joslin |
| 3,508,766 A | 4/1970 | Kessler et al. |
| 4,063,980 A | 12/1977 | Trunnell |
| 4,095,825 A | 6/1978 | Butler |
| 4,328,608 A | 5/1982 | Gibson |
| 4,696,499 A | 9/1987 | Butler |
| 4,738,145 A | 4/1988 | Vincent et al. |
| 4,812,503 A | 3/1989 | Baseman |
| 4,865,359 A | 9/1989 | Roberts |
| RE34,063 E | 9/1992 | Vincent et al. |
| 5,271,141 A | 12/1993 | Vincent |
| 5,300,336 A | 4/1994 | Wong et al. |
| 5,794,982 A | 8/1998 | Green et al. |
| 6,588,266 B2 | 7/2003 | Tubel et al. |
| 7,587,923 B1 | 9/2009 | Garza |
| 8,287,005 B2 | 10/2012 | Leslie et al. |
| 2002/0094247 A1 | 7/2002 | Wartluft et al. |
| 2004/0094048 A1* | 5/2004 | Yamanaka ............... B30B 15/16 100/269.01 |
| 2007/0124220 A1 | 5/2007 | Griggs et al. |
| 2011/0106460 A1 | 5/2011 | Konopacki et al. |
| 2012/0304637 A1* | 12/2012 | Allen .................... F03B 13/189 60/501 |
| 2014/0310942 A1* | 10/2014 | Li .............................. F16L 1/10 29/458 |

FOREIGN PATENT DOCUMENTS

| | | | |
|---|---|---|---|
| CN | 2618840 | 1/2013 | |
| DE | 19814202 A1 * | 10/1999 | ............. B30B 15/16 |

OTHER PUBLICATIONS

Google Machine Translation of CN101513778, https://patents.google.com/patent/CN101513778A/en?oq=CN+101513778A+[Sep. 27, 2018 4:53:09 PM] (Year: 2018).*

International Search Report, PCT/US2015/055142, dated Feb. 12, 2016, 4 pages.

Written Opinion, PCT/US2015/055142; dated Feb. 12, 2016; 6 pages.

* cited by examiner

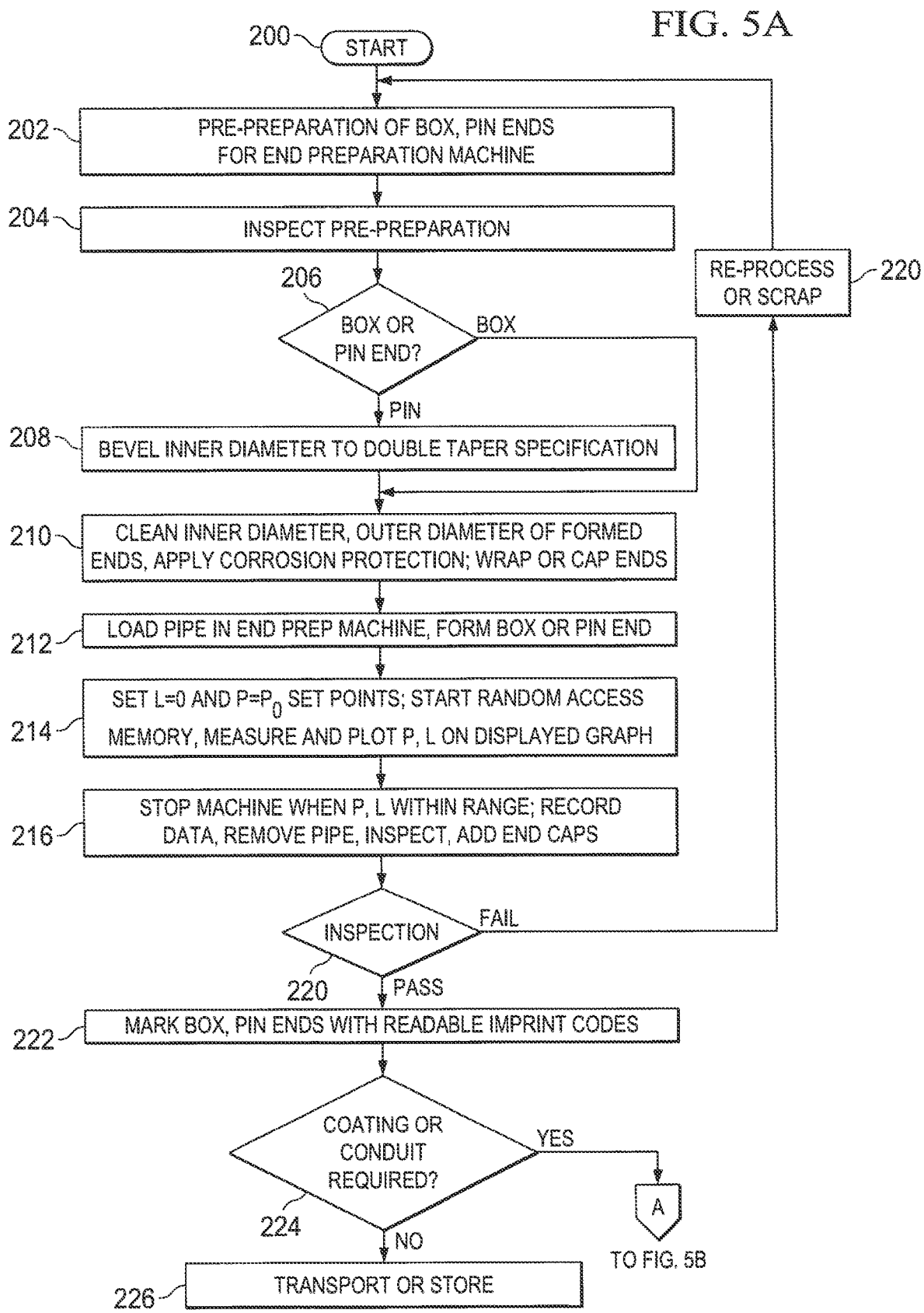

APPARATUS AND METHOD FOR ASSEMBLING, MEASURING, AND MONITORING INTEGRITY OF MECHANICAL PIPE JOINTS

CROSS REFERENCE TO RELATED APPLICATIONS

This application claims priority to U.S. Provisional Patent Application Ser. No. 62/062,944 filed Oct. 12, 2014 by the same inventors and entitled SYSTEM AND METHOD FOR MEASURING AND MONITORING PARAMETERS OF PRESS FIT MECHANICAL PIPE JOINTS AND PRODUCING STANDARDS FOR SAME

BACKGROUND OF THE INVENTION

1. Field of the Invention

The present invention generally relates to mechanical press fit pipe joints, and more particularly to a computer-implemented system and method for measuring and monitoring parameters of press fit mechanical pipe joints during both manufacturing and assembly of pipe segments, the construction of pipelines, monitoring environmental conditions and stresses experienced by the mechanical press-fit pipe joints, and utilizing the data produced thereby to formulate standards for mechanically joined pipe segments.

2. Background of the Invention and Description of the Prior Art Pipelines for conveying commodities and other substances—typically fluid materials, including oil and liquid products refined therefrom, as well as natural gas, compressed gas, and $CO_2$ to name some examples—over long distances are subject to a variety of conditions and forces that can act to cause failures in the pipeline such as breaks, ruptures, or leaks. These failures may be expressed by tension or compression forces exerted on the joint, or by bending, twisting, or vibration of the pipeline, etc., generally due to excessive internal pressures or geological or meteorological conditions present at the location of the pipeline. A pipeline is typically constructed of sections of pipe joined together end-to-end by various means. The utility, integrity, and longevity of the pipeline in the widely varying conditions noted above depends critically on the quality of the joints. A variety of methods are used to join the pipe sections together, including but not limited to welding, threaded joints, cemented joints, and mechanical joints.

While capable of providing secure, reliable, and durable joints, the more common methods of welding, threading, and cementing involve relatively time-consuming, labor-intensive operations during manufacture or preparation such as the welding operation itself, machining the pipe ends to cut the threads, honing and cleaning the surfaces to be joined when cements or epoxy materials are used to join the sections together. These operations may extend the time to install a pipeline, and increase the costs of construction, thereby reducing the productivity of the enterprise. Mechanical press fit joints, on the other hand, offer the potential for rapid construction at much lower costs, eliminating a substantial portion of the labor-intensive work of the traditional methods of joining pipe sections together. In a mechanical joint the end of one section of pipe, slightly enlarged (called a "bell" or "box" end) is forced—i.e., press fit—over the adjoining end of the other section, which may be slightly tapered (called a "pin" end) to accommodate the passage of the box end over the pin end. Typically the ends thus pre-shaped are aligned and hydraulically pressed together until a prescribed amount of overlap of the box end of a first pipe segment over the pin end of the adjoining pipe segment is achieved. Mechanical joints thus formed are rapidly made, resulting in much less time to construct a pipeline, usually involving fewer workers.

However, mechanical joints rely principally on the uniformity and area of contact along the interface between the pipe ends pressed together, one over the other, to provide and maintain the leak-proof integrity of the joints. To an observer during assembly of mechanical pipe joints, the only parameter of interest appears to be the amount of overlap of the two pipe ends under the pressure employed to assemble the joint, which is not subject to measurement during assembly. However, this parameter does not take into account variations in the tooling (e.g., due to wear or failure to maintain dimensions within tolerance), deformation of the pin or box ends of the pipe sections as may be caused by dropping the pipe sections on end during loading or unloading, defects in the surface of the contact areas of the pipe sections to be joined (e.g., scratches or corrosion), the ambient temperature at the site of joint making, or the temperature of the pipe sections at the time of joint making, for example. Moreover, typical assembly practices include no significant preparation of the pipe ends such as cleaning, inspecting, etc. to ensure that the pipe joint will have adequate strength and integrity over its useful life.

As a result, mechanical joints are found less often in pipelines designed for conveying flammable or toxic materials, for example, where failures may be catastrophic, damaging the environment, causing injury, disease, or death, etc. Moreover, the conventional method of gauging the correct assembly of box-to-pin ends of pipe sections—marking the pin end of one section to be joined with paint, wax, or chalk a few inches from the end to indicate how far the box end of the other section to be joined should overlap the pin end—leaves much to be desired in terms of repeatability and consistency because of the reliance on a single, hand-applied mark and the manual coordination of the operators that inscribe the mark, and apply the pressure to join the sections. While this method is quick, the margin of potential error is substantial, and likely insufficient to guarantee the integrity of the joint under all field conditions, particularly if the pipe sections are out of spec as to their dimensions, have defects or anomalies due to corrosion, deformation (e.g., departure from roundness), scoring, etc. More importantly, there is no measure of the integrity of the joint, no traceable record or data of the joint or its assembly, no direct and verifiable relationship between the proximity of the end of the box section to the mark on the pin section and the ability of the joint thus formed to withstand the conditions of use in the pipeline.

Some potential for errors can be reduced through testing of sample joints in a laboratory, using tests for pressure, tension, compression, bending, and perhaps twisting, temperature cycling, or vibration for example. Assembly workers can measure the distance of the internal shoulder in the box or bell end from the end of the pipe (if one has been machined therein) and use that dimension to place the mark in the pin end. However, even though such tests may be performed under controlled conditions, it is impractical to simulate all of the variables that can occur in an actual installed pipeline, over the life of the pipeline. Because press fit mechanically joined pipe tends to lack the same degree of metal-to-metal contact that is considered inherent in welded or threaded joints, ways to demonstrate the integrity and strength of press fit joints are needed so that mechanically joined pipe can compete effectively with the traditional methods.

In the face of such simplicity and potential for error, and the lack of performance measures for mechanical pipe joints, what is needed are improved methods for mechanically joining pipe sections together and improvements in the methods for measuring the relevant parameters of a mechanical joint to ensure that a joint of high quality, integrity, and consistency is formed at each joint in a pipeline, and that enable the retrievable collection of data about the joints thus formed both as to the original assembly of the joints and the performance of the joints in situ over time. Improvements must demonstrate superior performance at substantially reduced costs to become viable alternatives to the traditional methods of welding, screw threads, or cementing the pipe sections together.

SUMMARY OF THE INVENTION

Accordingly there is disclosed herein a process for preparing pipe sections for operations to form the ends into pin and box configurations for forming mechanical press-fit pipe joints in a pipeline, comprising the steps of inspecting raw pipe sections for acceptance into pre-preparation processing; beveling, to a predetermined angle, an inside edge of an end of a pipe section to be formed with a pin end configuration; bypassing the previous step if the end of the pipe section is to be formed with a box end configuration; cleaning the inner and outer surfaces of the ends of the pipe section; applying a corrosion inhibitor to the cleaned inner and outer surfaces of the pipe section; and transferring the pre-prepped pipe section to a storage location or to an end-forming location.

In another embodiment of the invention, a system is disclosed for forming first (box) and second (pin) ends of sections of pipe to form a mechanical press-fit joint between the sections of pipe in a pipeline, comprising: an end-preparation bench comprising a stationary tooling support and an opposing movable pipe clamp mounted on the bench, the stationary tooling support configured with a die for forming a box end or a pin end of a section of pipe, and the movable clamp connected to a hydraulic ram for drawing the movable clamp toward the stationary tooling support; a pressure sensor for measuring hydraulic line pressure P for operating the hydraulic ram; a stroke length sensor for measuring the length L of travel of the die within or over the pipe end being formed; a data acquisition unit coupled to the pressure sensor and the stroke sensor for receiving and converting outputs of the pressure and stroke sensors to digital form; a processor including non-volatile memory and a display, the processor coupled to an output of the data acquisition unit and configured for measuring, under control of a program stored in the memory, the hydraulic pressure and the length of travel of the die occurring while forming the respective box or pin ends of a pipe section supported in the movable clamp; and the processor further configured for displaying the measured hydraulic pressure P and the stroke length L in graphical form on the display while forming the respective box or pin end of the pipe section.

In another embodiment of the invention, a process is disclosed for preparing pipe sections for assembly in a pipeline using mechanical press-fit pipe joints to join the pipe sections, comprising the steps of performing a pre-preparation process for each section of raw pipe; forming respective pin and box ends of each section of pipe for joining using the mechanical press-fit pipe joints; measuring and storing at least two parameters associated with preparing the pin and box ends of the pipe sections using a process monitoring computer system, wherein a data record of the at least two parameteis of the formation of each pin and box end is created and stored; marking each pin and box end of each pipe section with a permanent encoded data panel recording identification and end preparation data for the associated pin or box end; coating the formed pipe sections according to specifications applicable to the expected use of the pipe sections in a pipeline; and installing a pipeline data monitoring bus on each section of pipe.

In another embodiment a system is disclosed for forming a pipeline of sections of pipe using mechanical press-fit joints between first and second ends of the pipe sections, comprising: an assembly bench comprising first and second opposing pipe clamps mounted on the bench and connected by a hydraulic ram for drawing the first and second opposing pipe clamps toward one another; a pressure sensor for measuring hydraulic line pressure for operating the hydraulic ram; a stroke sensor for measuring penetration of the first pipe end by the second pipe end; a data acquisition unit coupled to the pressure sensor and the stroke sensor for receiving and converting outputs of the pressure and stroke sensors to digital form; a processor including non-volatile memory and a display, the processor coupled to an output of the data acquisition unit and configured for measuring, under control of a program stored in the memory, the hydraulic pressure and amount of penetration occurring while forming a press-fit joint of the pipeline; and the processor further configured for displaying the measured hydraulic pressure P and the penetration L in graphical form on the display while forming the press-fit joint of a pipeline; transporting the completed pipe sections to a pipeline site for assembly; assembling the pipe sections to form a pipeline; installing pipeline sensor circuit modules and connect them to the pipeline data monitoring bus; and testing the completed pipeline system for integrity and operation.

In another embodiment a system is disclosed for monitoring operational and environmental conditions affecting an installed pipeline, comprising a data monitoring bus installed on the pipeline surface; a data sensing module installed at each pipe joint and connected to the data monitoring bus; a pipeline data acquisition system communicatively coupled with the data monitoring bus at selected intervals along the data monitoring bus; and a communication interface in the pipeline data acquisition system coupled via a network to a data management center for receiving, storing, and processing data provided and communicated by the data sensing modules.

In another embodiment a process is disclosed for measurement and control of machine and assembly operations on sections of pipe to be used in commodity pipelines, comprising the steps of forming in respective opposite ends of the pipe sections a pin end and a box end, wherein at least first and second predetermined parameters associated with forming the respective ends are met within a predetermined tolerance during formation of the respective ends; forming a mechanical press-fit joint between first and second sections of pipe in a pipeline wherein a pin end of the first section of pipe is inserted into the box end of the second section of pipe until the at least first and second predetermined parameters are met within a predetermined tolerance during assembly of the mechanical press-fit joint; and measuring, and displaying on a graphic display, the at least first and second predetermined parameters as the pin end and box end are formed and as the first and second sections of pipe are assembled together.

In another embodiment a data management system is disclosed for pipelines constructed using mechanical press-fit joints to connect sections of pipe together, comprising a data acquisition system coupled to the pipeline and to a network; a data management computer system including at least one computer having a display, non-volatile memory and a suite of applications software installed therein, the computer system coupled to the network for processing data provided by the data acquisition system; a database coupled to the data management computer system for storing data originating from the data acquisition system and processed by the data management computer system; wherein the suite of applications software includes at least one operating program for processing data measurements regarding pipeline operating parameters and conditions originating from the data acquisition system.

BRIEF DESCRIPTION OF THE DRAWINGS

FIG. 5A illustrates a first section of one embodiment of a flow chart directed to the processes of preparing the Box end and Pin end of the pipe for assembly to construct a pipeline;

DETAILED DESCRIPTION OF THE INVENTION

Introduction

Figure 13:
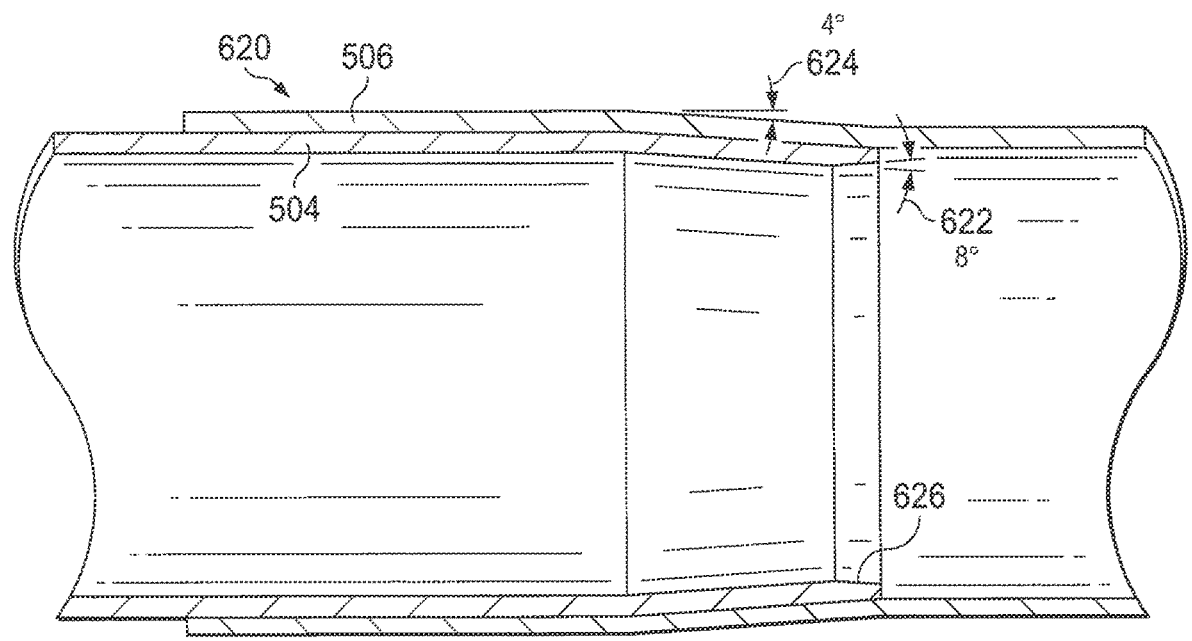
FIG. 13 illustrates a cross section view of an assembled mechanical press-fit pipe joint formed according to the present invention.

In an advance in the state of the art a system and associated apparatus and methods are disclosed for forming mechanical press-fit pipe joints having more uniform and consistent performance, thereby overcoming the deficiencies mentioned herein above. Data gathered, stored, and analyzed may be utilized to control both the process for forming the pipe ends prior to assembling them and the mechanical press-fit joint assembly process itself. The processes both produce superior mechanical press-fit joints and provide logging data for setting standards and enabling pipeline integrity monitoring to track pipeline conditions and performance, detect malfunctions and failures, etc. Basic data such as the pressure employed to form the pipe ends and assemble the mechanical press-fit joint, and the length of the overlap of the box (or bell) end into the pin (or cone) end being formed or joined may be accumulated and used for pipeline logging, on-going analysis, and the development of standards for mechanical press-fit pipe joints and pipeline integrity in general. Herein after the mechanical press-fit pipe joint may be called a MPF joint, referring to pipe sections joined by the apparatus and processes described herein. A MPF joint is depicted in FIG. 13 as reference number 620.

The accumulated data may be developed into a standard index of the fitness of an assembled mechanical press-fit joint for use in monitoring assembly, formulating industry standards, etc. Superior joints may be ensured when measurements made during preparation of the ends of the pipe sections and assembling the MPF pipe joints fall within a unique index range derived from measured assembly data and subsequent test data performed on the assembled joints. Standards for pipe of different size, weight, wall thickness, material, and grade may be developed from the accumulated assembly and test data. Monitoring of pipelines, either as routine periodic inspections or to locate pipeline integrity deviations, may be facilitated by access to stored data and the ability of a pipeline authority to utilize the tagging and logging systems disclosed herein to obtain accurate data regarding pipeline integrity. As is well understood, monitoring and inspection regimens are critical to being able to quickly locate and diagnose problems in pipelines, to discover small problems before they become large problems.

The system to be described may include a multiple input data acquisition device coupled with a programmed processor and graphical user interface, wherein the graphical user interface may be controlled by specialized software to enable the user to view the parameters of interest in real time while a press-fit pipe joint is being assembled. These functional units may be embedded in a computer or provided as separate structures, collectively called a 'computer.' A database may be coupled to the computer or the system for accumulating data. Sensors connected to the data acquisition inputs may include components that, for example, sense the pressure P exerted to force the pipe sections together, the length L of the stroke or overlap of the pipe ends being joined, and other sensors for indicating dimensions or temperature conditions. The computer may be connected through the sensors to the hydraulic swaging (aka swedging) machines that perform the forming and assembly operations on the pipe ends. For example, the pressure measurement may be the hydraulic line pressure in lb./in$^2$ ("psi") applied by the machine for assembling the formed ends to complete an MPF joint. The length measurement may be the distance in inches that the box end of a first pipe section overlaps the pin end of the second pipe section being connected to the first section. The system may also be used during the process of forming the pipe box and pin ends on dies held by a mandrel in a suitable hydraulic swaging machine to be described. The pressure applied directly to the mandrel/die assembly by the machine, and the traverse of the die along the pipe end may also be measured and recorded by the apparatus and process to be described herein.

In measuring the overlap or stroke length L of the box end, one type of sensor is called a string encoder (or string pot, draw wire, or yo-yo pot). Other types of length sensors may include optical or acoustical mechanisms. Regardless of the method used to measure and indicate the overlap length, a datum or starting point may be established, for example by positioning the box end close to the pin end (within a prescribed tolerance, such as +¼-0 inch) and setting the overlap length measurement to zero. Various techniques for establishing such reference are well known in the art. In measuring the pressure exerted by the hydraulic machine to form the pipe ends or to assemble the pipe ends together, the pressure P is likewise set to a "low set starting point" such as 10 psi, which is a reference or initial condition value.

Other facilities provided in the system for the computer may include USB ports for connecting keyboards, interfaces to GPS equipment, etc.; outputs for video or other baseband signals such as HDMI outputs; data links to databases to store the data with historical records; connections for links via Ethernet or other network interface standard, and the usual connections for power, indicators, etc. The computer may be interfaced through suitable communication links with production or assembly apparatus, and may include control mechanisms for operating the production or assembly apparatus. Such mechanisms may include software, links to machine elements such as servomechanisms, switches, indicators and gauges, etc. Typical machine elements for forming the ends of the pipe include a hydraulic swaging machine. The forming die is supported in a mandrel that is held by a stationary or moving portion of the machine. An assembly machine is very similar to a swaging machine except that it forces two opposing pipe ends together under hydraulic pressure in the same manner as a swaging machine to join them together instead of forcing the end of one pipe section over a die to shape it.

Figure 7:
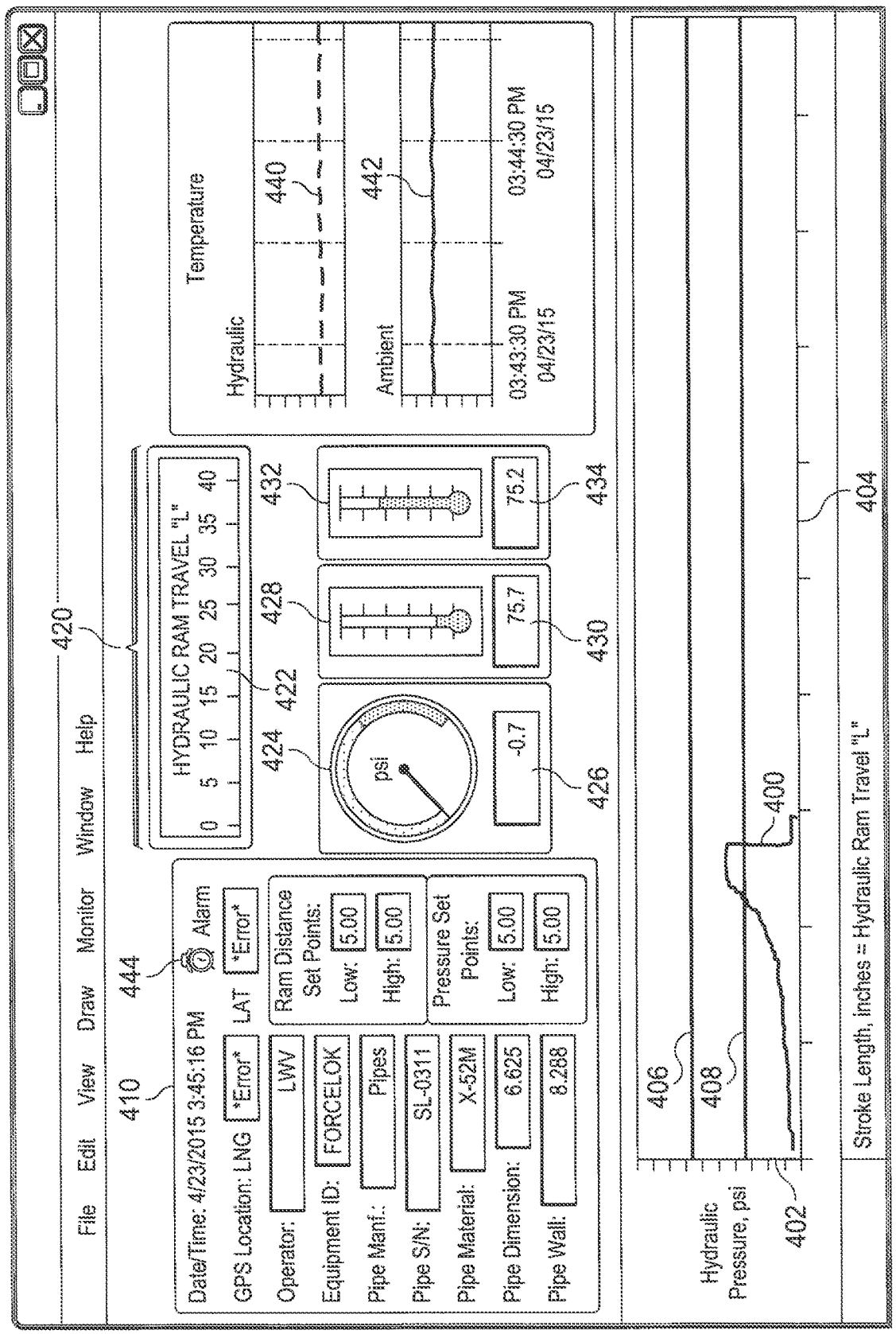
FIG. 7 illustrates a screen shot of a graphical display that depicts data measured during operation of the embodiments of FIGS. 3, 4, 5, and 6.
Figure 8:
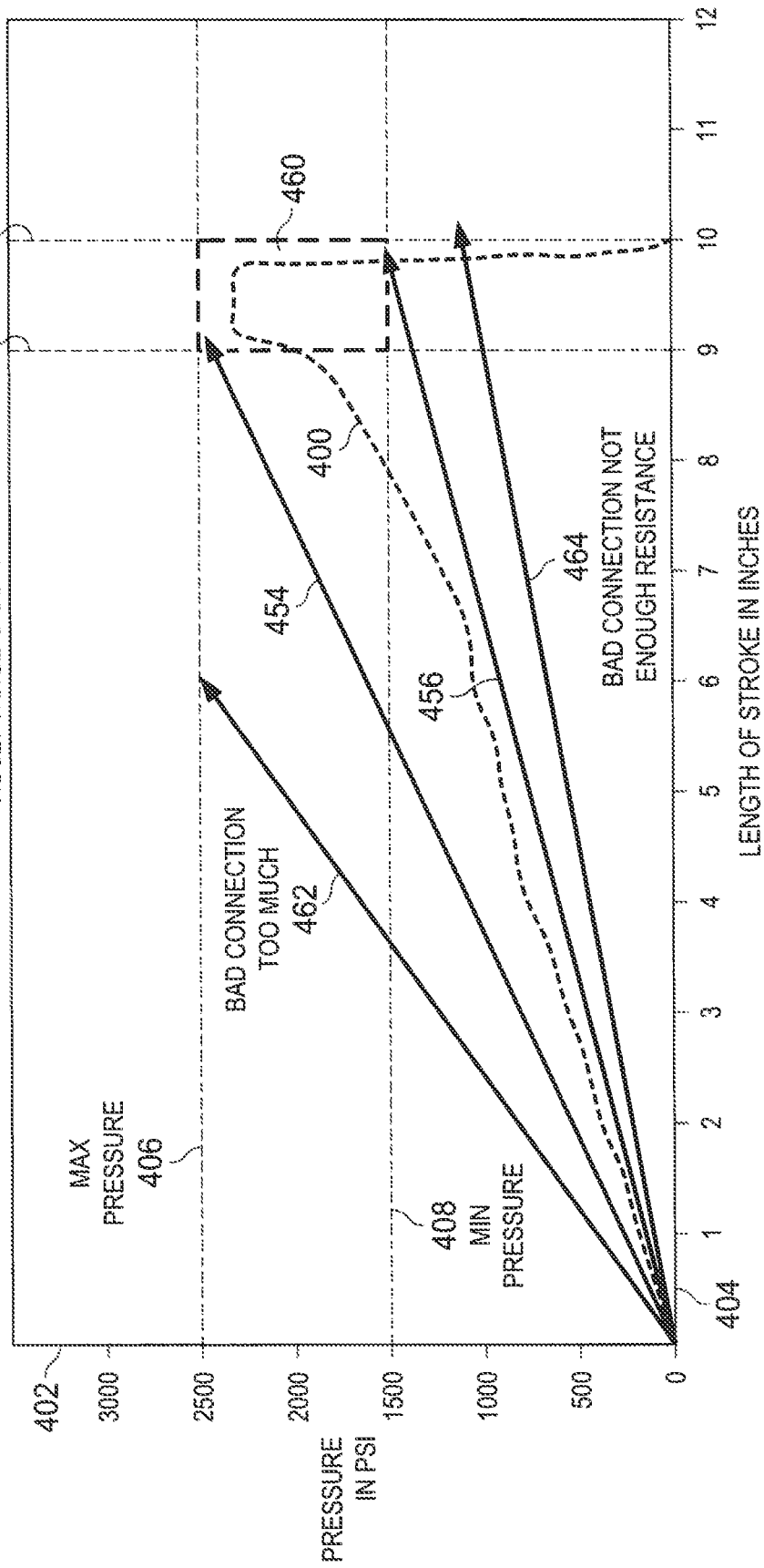
FIG. 8 illustrates a method of interpreting the data displayed in the graphical display of FIG. 7.

Also to be disclosed herein is a new index developed to provide a readily observable and repeatable indication of the correct amount of overlap of the pin end by the box end to establish an acceptable MPF pipe joint. The purpose of such an index is to identify the instant that a correctly formed MPF joint is formed. One example is to multiply the hydraulic pressure P (lb/in$^2$) used to press the two pipe ends together by the length of overlap L (in) of the box end over the pin end. This product has the units lb/in, which are the units of linear deflection, and may or may not be correlated with the amount of force needed to force a box or bell end of pipe onto a pin or cone end of pipe. The combination of the values of P and L that indicate a correctly formed mechanical press-fit pipe joint is also clearly evident in a graphical plot of P vs. L as shown in FIGS. 7 and 8 to be described. The parameters P, representing the hydraulic pressure need to form the end of a piece of pipe or to assemble two formed pipe ends together, and L, representing the length of overlap of one section over the other or the distance traveled in forming a box end to a pipe section, are based on similar parameters of importance when assembling pipe sections by other methods, such as welding or screw threads. In both traditional methods of joining pipe sections, the length of overlap L is a key parameter that is expressed by the dimensions of the box end that will overlap the pin end of the opposing section. For welded joints the length of overlap L will depend on the type of welding, the required structure of the finished joint, and other factors such as the size and material of the pipe. For threaded joints, characteristics such as the type and pitch of the threads, whether sealants are used when assembling the joint, etc., along with the other characteristics of the pipe, will govern the choice of the parameter L.

To understand why the parameters are useful in measuring the formation of mechanical pres-fit pipe joints an example of a traditional method of joining pipe ends together may be helpful. Steel pipe as used in pipelines is a heavy component, so turning a section of threaded pipe onto an opposing section of pipe having mating threads may require use of a hydraulic machine to provide the necessary motive power. As the first section advances onto (or into) the second section, a certain amount of friction within the threaded area must be overcome by the hydraulic pressure to operate the machine that turns the first section against the friction developed in contact with the second section. As the joint nears completion, the end threads of one of the sections are reached, causing the hydraulic pressure to increase more rapidly. This condition indicates a joint that is close to being fully formed. In fact, the particular pressure can be a useful measure of a sufficiently threaded joint. Before that pressure is reached, the joint is likely incomplete; beyond the point where the pressure P begins to increase more rapidly is a reference pressure that if exceeded may result in stripped threads, a split pipe or other defects. The pressure indicating a proper threaded joint would be expected to lie between these two values, and will likely be closely related to the length of overlap, L. Similarly, for welded joints, the dimensions of the pipe, in particular the portions of the box and pin ends that are in contact—such as the total surface area in contact of the joint will be related to the pressure P needed to assemble the pipe ends together and the length of overlap L.

One way to visualize the effect of these two variables P and L is to plot one variable vs. the other on rectangular coordinates. This will yield a curve having a positive slope as the pressure increases with increasing overlap. If the acceptable values of P and L are given a tolerance, say +/−5%, for example, then an acceptance rectangle defined by the minimum and maximum permitted values of both parameters can be superimposed on the graph and its area can be calculated or delineated on the graph. The tolerance in this example is chosen to illustrate the concept. The correct tolerance may be developed from empirical data obtained during actual use. Operation of the apparatus that joins the pipe ends together until the P L curve enters the acceptance rectangle provides a readily observable indicator of a correctly assembled joint. Further, the measured values input to the computer by the sensors appear on the graphic display and also may be stored for later use. The index may be called "the force-fit number," "the PL product," or "the press fit product" for example. If the "PL product" is within this acceptance window on the graphical display, it is because the product of the pressure P and the length L correlates with substantial and uniform metal-to-metal contact between the box and pin ends of the pipe. This is just one example of an index and its use in facilitating the assembly of press fit mechanical joints in pipe.

The index described above may be related to other variables such as the temperature at the construction site. The accumulation of data for many installation sites, type and size of pipe, along with the values of P, L, and temperature T may suggest process variations that ensure the most reliable press fit pipe joint. The accumulated data may be recorded in tables to assist in set up of the press fit apparatus for assembling the pipe, either for constructing new pipelines or repairing old ones to return them to service. Such data can be important because temperature affects not only the malleability of the pipe material, its dimensional variations due to expansion and contraction, but also the viscosity of the hydraulic fluid used in the press fit apparatus. If sealing compounds or epoxy or other adhesive materials are use in the joint, their properties will also likely be affected by temperature variations. In general, assembly tables for MPF joints may be constructed for any variable representing a parameter involved in the press fit assembly process.

The data thus accumulated may be accessible to qualified users or subscribers, to pipeline authorities, pipe manufacturers, pipeline contractors, and the like. The data may be viewed as historical data or observed in real time. Data may be correlated with a particular manufacturer or mill that produced the pipe being installed. Access to the data may readily be provided via the Internet or other networks.

Description of the Press-Fit Apparatus

The press fit apparatus to be utilized in the system and process described herein includes two hydraulic press devices. They are similar in appearance, but are configured differently to fulfill their specific functions. Each may be thought of as a bench or frame equipped with rails along which hydraulically operated clamps or stocks are mounted. In an "end preparation" machine, a sliding stock may be mounted on the rails at the end of the bench connected to a source of hydraulic pressure. The sliding stock supports tooling~a die held by a mandrel~for forming either of the pipe box or pin ends. On the opposite end of the rails a clamp assembly to securely hold the pipe section to be formed may be fixed to the rails along the same longitudinal axis as the die. The movable die may be forced or driven toward the stationary pipe end under hydraulic pressure supplied to the movable stock by a hydraulic pump. The hydraulic pump may be driven by an internal combustion engine, typically a diesel engine. The end preparation machine may typically be used at a site convenient for forming the box and pin ends of the pipe sections. The site may or may not be located at the site where the pipe line is being constructed.

The clamp section may have hydraulically operated semicircular jaws joined on one side at a pivot along a radius spaced just beyond the semicircular portions so that the jaws may be placed around the pipe to be gripped and drawn together by hydraulic pressure to clamp the pipe in position. The open ends of the jaws may be coupled together along a hydraulic cylinder to enable the jaws to be opened and closed. The semicircular jaws may be fitted with dies to fit the particular diameter of pipe to be joined.

In a "field assembly" machine, which is very similar to a hydraulically operated swaging machine apparatus, the rails on the bench or frame support two opposing clamp sections that may be used to support the pipe ends to be joined. One of the clamps may be secured to the rails, while the other one may be configured to slide along the rails under the application of hydraulic pressure to cylinders secured to the sliding clamp. As in the end preparation machine, the rails ensure T least one of the clamp sections can move toward and away from the other clamp section while maintaining a fixed longitudinal relationship with each other, thus ensuring that the pipe ends to be joined are correctly aligned. The same type of pivoting jaw clamp sections may be used to secure the pipe ends for joining. In use at a pipeline site, the assembly machine may be supported by a side crane mounted on a transport vehicle. A hydraulic pump for operating the filed assembly machine may be driven by an internal combustion engine such as a diesel engine. The vehicle can thus travel along the side of the site to position the assembly machine at the location of each pair of pipe ends to be joined.

Both the end preparation and field assembly machines may preferably be coupled to a computer monitoring system ("CMS" or, "computer") for measuring certain selected parameters involved in the MPF joint operations, including either the preparation of the pipe ends for joining or the assembly of the prepared ends in the field. The CMS, part of a process monitoring subsystem 24 (See FIG. 1), may preferably be programmed for processing measurement data provided by appropriate sensors, for converting the data to a form that may be displayed graphically on a display screen, for storing the data and processed forms of it ("data products") in a database, and for communicating the data and data products via a network to external locations for data and process management, and the like.

The system for operating the end preparation and field assembly machines also includes a data acquisition unit coupled to inputs of the CMS for receiving the parameter sensor outputs and converting those signals to digital form for processing by the computer monitoring system. The sensors may preferably be transducers for measuring the hydraulic line pressure P supplied to the hydraulic cylinders that operate the end preparation and field assembly machines, and a linear displacement transducer for measuring the length of the stroke L necessary to provide the correct amount of overlap of the box end of one section of pipe over the pin end of the adjoined section of pipe. Examples of a linear gauge transducer include a "string potentiometer" (or "string pot" or "yo-yo pot"), and a laser displacement meter, which are well known in the art. The operating programs that controls the CMS may be stored in non-volatile memory in the computer monitoring system.

A graphical display screen coupled to the computer is preferably used to display graphs of the parameters or data products produced by the CMS. Of principle interest is a plot of the hydraulic pressure P used to advance the movable clamp holding a pipe end toward its opposite number either the forming die or tooling of the end preparation machine or the clamp holding the end of the other section of pipe to be joined—and the length L of the overlap stroke produced during the formation of a mechanical press-fit joint. The pressure P is plotted versus the length L, P along the vertical axis and L along the horizontal axis. The resulting curve typically has a positive slope as the pressure increases with the increase in length of overlap. The slope and shape of the curve may contain information about the condition of the formed joint or operating conditions of the machine being monitored. This information is highly useful in gauging the quality of the joint and its longevity prospects, and is also useful in diagnosing anomalies in the pipe or the joining process. Further, as the data is stored for later analysis and the creation of a historical record, much can be learned about the pipe materials, the processes used in its manufacture and assembly, and about the integrity of the pipeline and pipeline joints in future years. The historical data in particular will be instrumental in developing better methods of joining pipe sections together in the field.

DETAILED DESCRIPTION OF THE SYSTEM

Figure 1:
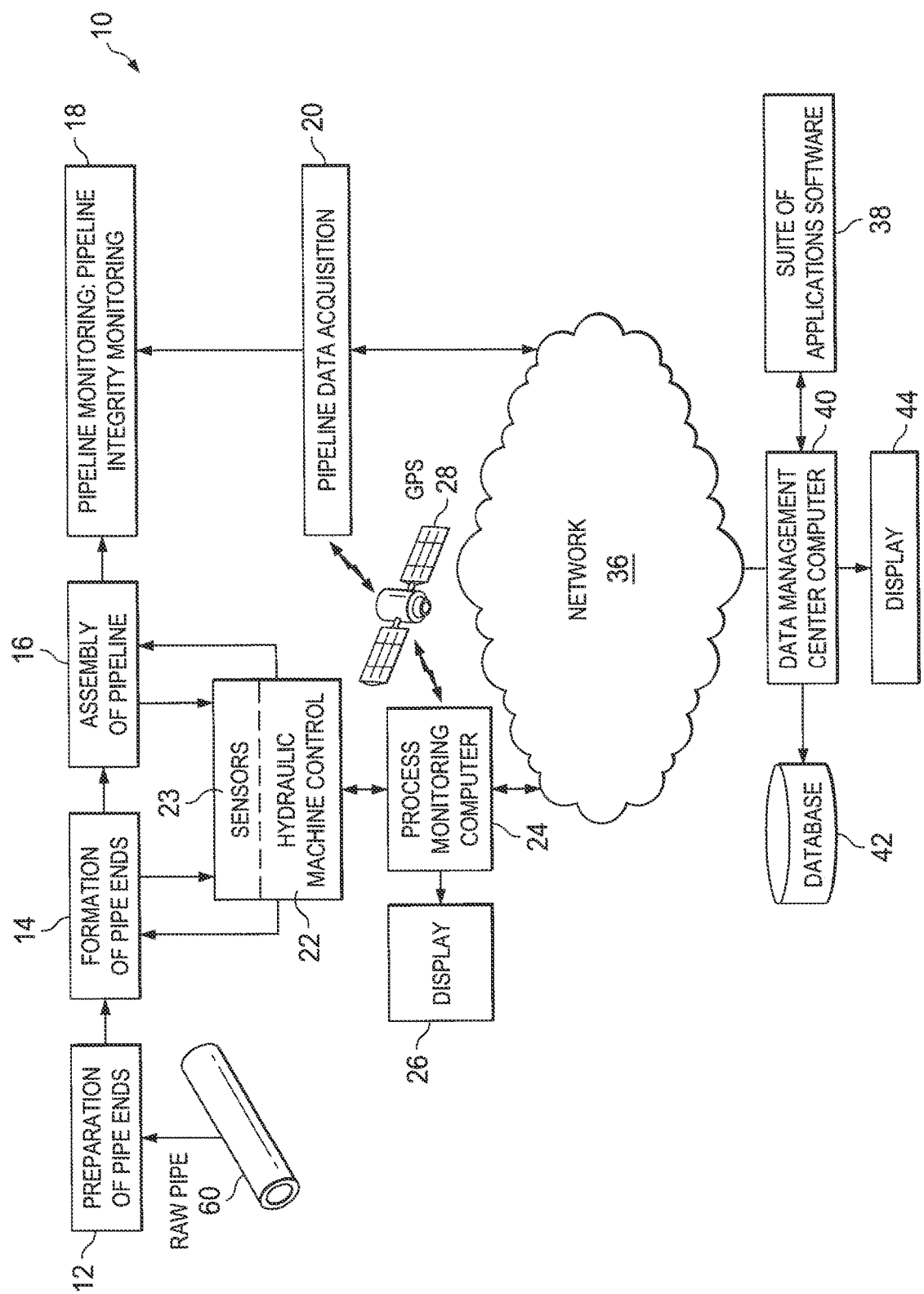
FIG. 1 illustrates a system block diagram of one embodiment of the present invention.

In the following description, reference numbers appearing in more than figure refer to the same structures. FIG. 1 illustrates a system block diagram of one embodiment of the present invention. This embodiment depicts the major components or subsystems of the system 10 that receives raw pipe 60 in a manufacturing environment, processes the pipe to prepare it for assembly into a leak-proof pipeline formed using mechanical press-fit pipe joints. The system 10 also provides for assembling the pipe to construct the pipeline while providing built-in facilities for measuring and accumulating data generated during the manufacturing, installation, and monitoring processes for analysis, maintenance, management, and the development of pipeline standards. Not shown in FIG. 1, as they are well known in the art, and do not form part of the present inventions, are the various transport and storage facilities that might, depending on particular circumstances, be involved in conveying the pipe through the series of subsystems depicted in FIG. 1.

The system 10 includes a series of major functional subsystems, beginning with facilities 12 for the receiving standard sections of raw pipe 60 (typically each 40 feet long) for undergoing the processes of preparing the ends of the sections of pipe 60 to be assembled into a pipeline using mechanical press-fit joints. The mechanical press-fit pipe joints referred to herein are forced together under pressure and require no welding or machining of screw threads of the ends of the pipe to join the sections together end-to-end at the pipeline installation site. The next subsystem comprises facilities 14 for forming the ends of the pipe to be joined together as mechanical press-fit joints. The facilities 14 may include machine apparatus powered by hydraulic pumps controlled by an operator (the hydraulic machine control 22), wherein the processes are monitored by a process monitoring computer 24 for receiving sensor data and displaying parameters of some of the preparation steps in graphical form on the display 26. The machine apparatus 14 supports the pipe end being formed in longitudinal alignment with a die as the die is forced over the pipe end under hydraulic pressure.

After the ends of the sections of pipe are formed into a box (or bell) end at one end and a pin (or cone) end at the opposite end in subsystem 14, the pipe sections are ready for assembly into the pipeline at the construction site, as represented by subsystem 16. The assembly of the pipe sections includes a machine apparatus powered by hydraulic pumps controlled by an operator (the hydraulic machine control 22), wherein the processes are monitored by a process monitoring computer 24 that displays parameters of some of the assembly steps in a graphical form on the display 26. The machine apparatus in subsystem 16, which may be a swaging machine adapted for handling pipe sections, supports the sections of pipe in longitudinal alignment as they are pressed together under hydraulic pressure.

During the formation of the pipe ends and the assembly of the pipe sections, apparatus that contains sensors and circuitry for monitoring the integrity of the assembled pipeline may be installed on the sections of pipe. The integrity monitoring circuitry applied in subsystem 18 continually measures a variety of conditions of the pipeline following its construction to provide for maintenance and safe, efficient operation of the pipeline. The data generated in subsystem 18 may preferably be forwarded to a pipeline data acquisition station 20.

Other components of the system include a hydraulic machine control 22 coupled to each of the formation 14 and assembly 16 machine apparatus. In typical embodiments these may be manually-operated controls and appropriate sensors 23 (as will be described) for measuring selected control parameters. A process monitoring computer 24 may be coupled to the machine control subsystem 22, 23 for receiving the sensor data and developing responses thereto. A display 26 connected to the process monitoring computer 24 provides visual, graphical representation of the control parameters. A process program for controlling operations of the process monitoring computer 24 including the graphical display of the hydraulic pressure P and the stroke length L may be stored in the non-volatile program memory. The process monitoring computer 24 may further include a communication interface for coupling to a network 36. The pipeline data acquisition subsystem 20 also preferably includes a communications interface coupled to the network 36. The network 36 enables data communication of the subsystems 20 and 24 with a data management center computer 40 (aka "DMC 40") for archiving and processing the data regarding the preparation, assembly, and monitoring of the pipe sections and the completed pipeline. A database 42 and display 44 are provided to facilitate the archiving and processing functions of the subsystem 40.

The DMC 40 computer may be a system of computers, servers, etc. as needed to perform the functions assigned to it in gathering, analyzing, and otherwise processing the data sent to the DMC 40. These and other functions may be provided by appropriate software developed for the purposes of managing these functions. A suite of applications software 38 may include at least one operating program for processing data measurements regarding pipeline operating parameters and conditions originating from the data acquisition system such as the hydraulic pressure P and the stroke length L data acquired during the end-preparation and field assembly operations. The data management center computer 40 may further be utilized in a data management system responsive to data obtained during monitoring of pipeline data by apparatus coupled to installed pipelines. Data communicated to the data management center computer 40 may be processed by components of the suite of applications software 38 accessible from the data management center computer 40. The suite of applications software 38 includes the necessary storage facilities, which may be directly coupled to the data management center computer 40 or accessible via a network to remote storage facilities, as is well understood in the art. The data obtained by such apparatus (to be described with FIGS. 9 and 10) may be processed and forwarded to the data management center computer 40 to perform services as described above under the control of the suite of applications software 38 selected or developed for these purposes as well as administration, troubleshooting and overall management activities for pipeline operators and other entities responsible for the safe and efficient operation of the pipeline.

Figure 2:
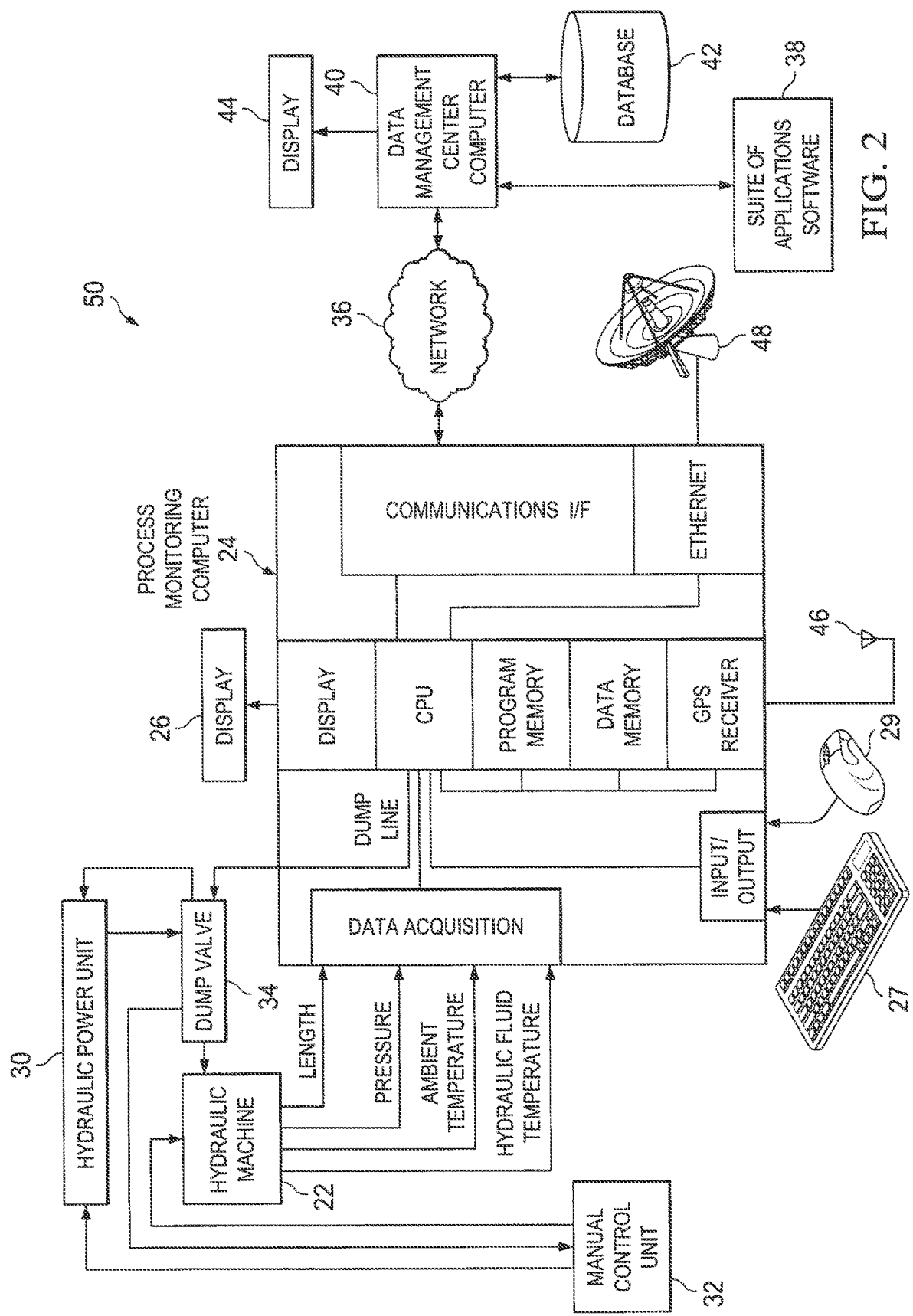
FIG. 2 illustrates a portion of the system of FIG. 1 that is directed to processing pipe for use in the system of FIG. 1.

FIG. 2 illustrates a pipe process system 50 that is directed to processing pipe for use in the system of FIG. 1. This figure expands somewhat the components of subsystems 22 and 24. The process monitoring computer 24 includes a number of functional sections: a CPU, program and data memories (including a non-volatile memory), and data acquisition, I/O, display processing, a GPS (global positioning satellite) receiver, and communication interfaces (including Ethernet). A keyboard 27 and mouse 29, and a GPS antenna may be connected to respective I/O and GPS receiver ports of the computer 24. The Ethernet port may be coupled with a satellite link or other communications provider. The data acquisition inputs may preferably be connected to the outputs of sensors, coupled to the hydraulic machine 22, providing signals for hydraulic pressure, a length gauge, ambient temperature, and hydraulic fluid temperature.

The hydraulic machine 22 is typically powered by a hydraulic power unit 30 such as a diesel powered pump (not shown) equipped with a manifold, fluid lines and valves to control the flow of fluid under pressure to actuators on the machines. The hydraulic machines may be operated by an operator using a manual control unit 32 while observing the display 26 that graphically displays the operating parameters while forming or assembling a mechanical pipe joint. One feature incorporated into the system of FIG. 2 is a dump valve 34 that may be operated manually or automatically to divert the high pressure flow of hydraulic fluid to a reservoir (not shown) associated with the hydraulic pump system in response to an abnormal operating hydraulic pressure as observed on the graphical display. This action stops the operation of the hydraulic machine apparatus to permit the operator to attend to the circumstances of the work piece—the pipe—that triggered the dump valve operation. The dump valve 34 is coupled in the hydraulic feed lines to the hydraulic machine. For example, if the pressure is excessive, the dump valve 34 may operate automatically; conversely, if the hydraulic pressure is insufficient, the operator may manually trigger the dump valve 34. Other conditions may be established for the operation of the dump valve 34.

Figure 3:
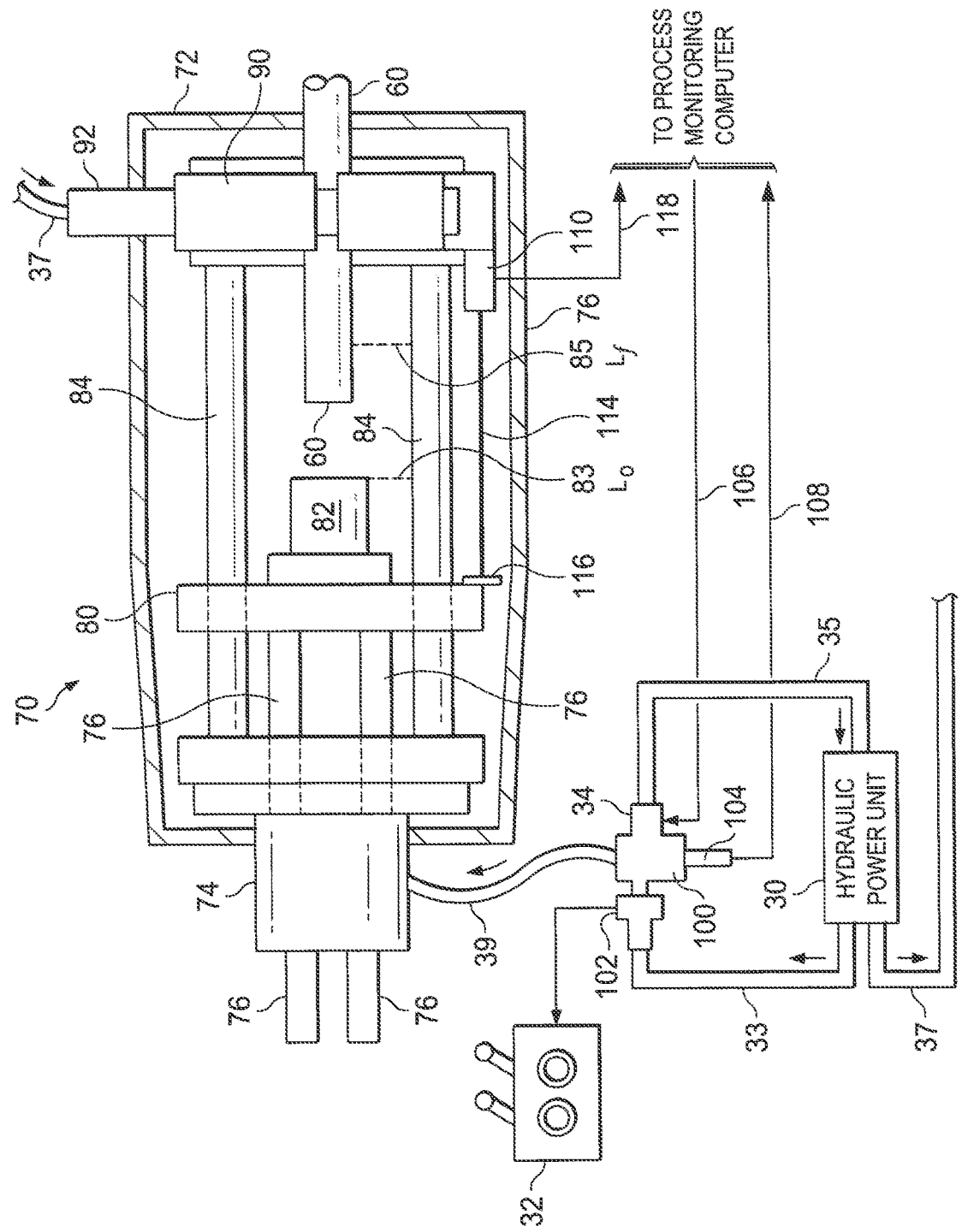
FIG. 3 illustrates a pictorial view of one embodiment of a pipe End Preparation Machine for use in the embodiments of FIGS. 1 and 2.
Figure 11:
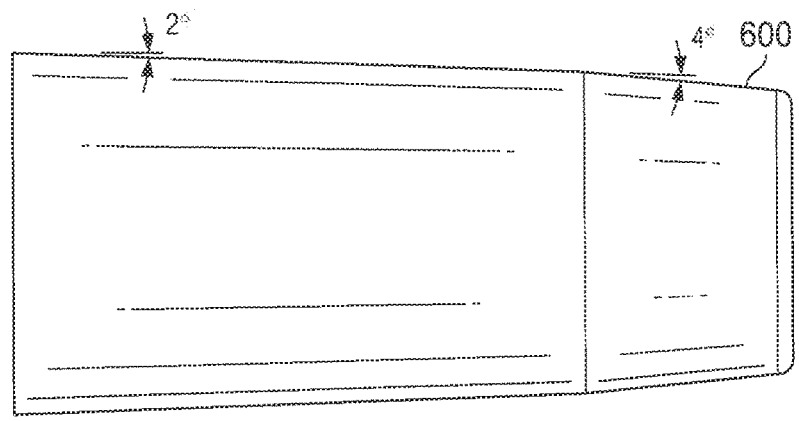
FIG. 11 illustrates a cross section view of a die for forming the box or bell end of a section of metal pipe.
Figure 12:
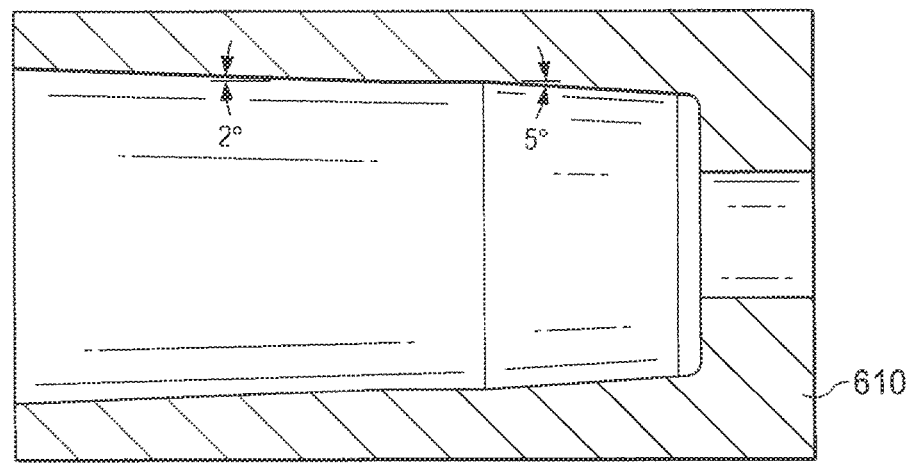
FIG. 12 illustrates a cross section view of a die for forming the pin or cone end of a section of metal pipe.

FIG. 3 illustrates a top side pictorial view of one embodiment of a pipe End Preparation Machine 70 for use in the embodiment of FIGS. 1 and 2. The end prep machine 70, supported by base 72, is configured to form the box and pin ends of a section of pipe so that the sections of pipe can be assembled, end-to-end, to form a pipeline, as depicted in FIG. 13 to be described. A sliding stock 80 (including a mandrel), which travels on guide rails 84, is driven by hydraulic cylinders 74 that cause the drive rods 76 to advance the sliding stock 80 along the guide rails 84. The sliding stock 80 is enabled to slide along the guide rails 84 for a distance that exceeds by a suitable margin the required length of the stroke to fully form the box end 504 or pin end 506 (see FIG. 13) of the pipe section during the end prep operation. The sliding stock 80 supports a die 82 (see FIG. 11) in the mandrel. The die may be either a box end die 600 or a pin end die 610 as shown in FIGS. 11 and 12. The sliding stock 80 advances the die 82 toward the facing pipe end 60 supported in a pipe clamp 90 that is secured to the base 72 of the end prep machine 70. The pipe end 60 is clamped in the jaws of the pipe clamp 90. The jaws of the pipe clamp are caused to move closed or open by the hydraulic cylinder 92.

Continuing with FIG. 3, measurement of the displacement or stroke length of the sliding stock to form the pipe end may be using any of several devices including a displacement measuring device selected from the group consisting of a string potentiometer, a measuring tape, and a laser rangefinder. In the illustrated example, string pot 110 may be secured to the pipe clamp 90 for measuring the length of the stroke L needed by the die 82 to fully form the pipe end 60. A string gauge 114, which is a length of line retractably stored in the string pot 110, may be secured in this example at its distal end to a tie point 116 attached to the sliding stock 80. As the sliding stock 80 moves from a predetermined reference ("zero") position the sting pot 110 measures the amount of string gauge 114 that is retracted as the die 82 advances from the zero reference $L=L_o$ to overlap the pipe end 60 by a specified amount $L=L_f$ to form a fully completed mechanical press-fit joint at $L=L_f$. This amount of retracted string gauge, sensed by the string pot 110 and converted to units of length—e.g., inches ("in")—is equal to the length L that is displayed in the graphical display and viewed by the operator as the pipe end is formed. The length measurement sensed by the string pot 110 is coupled to the data acquisition input of the process monitoring computer 24 via line 118. In other embodiments, the string pot 110 could be mounted to measure the value of L as the string gauge is fed outward.

Hydraulic pressure for operation of the end prep machine may be supplied from a diesel powered hydraulic power unit 30 through line 39, under the control of the manual control 32. Line 39 may be multiple lines depending on the structure of the hydraulic cylinder(s) used to power the sliding stock 80. Line 39 connects to the output of a junction block 100 that is supplied hydraulic fluid under high pressure from the hydraulic power unit 30 through a valve 102 controlled by the control 32. The amount of pressure—e.g., lb./in² ("Psi") is sensed by transducer 104, which is coupled to an input to the data acquisition section of the process monitoring computer 24 via a line 108. This transducer provides the sensor signal corresponding to the hydraulic pressure P to be described herein below. The junction block 100 includes the dump valve 34 that is controlled via a line 106 from the process monitoring computer 24 when it is necessary to interrupt apt the flow of hydraulic fluid to the hydraulic cylinders that control the advance of the sliding stock, for example when the pressure P exceeds a safe value. The dump valve 34 may also be manually operated by an operator (mechanism not shown for clarity, but is well known in the art).

Figure 4:
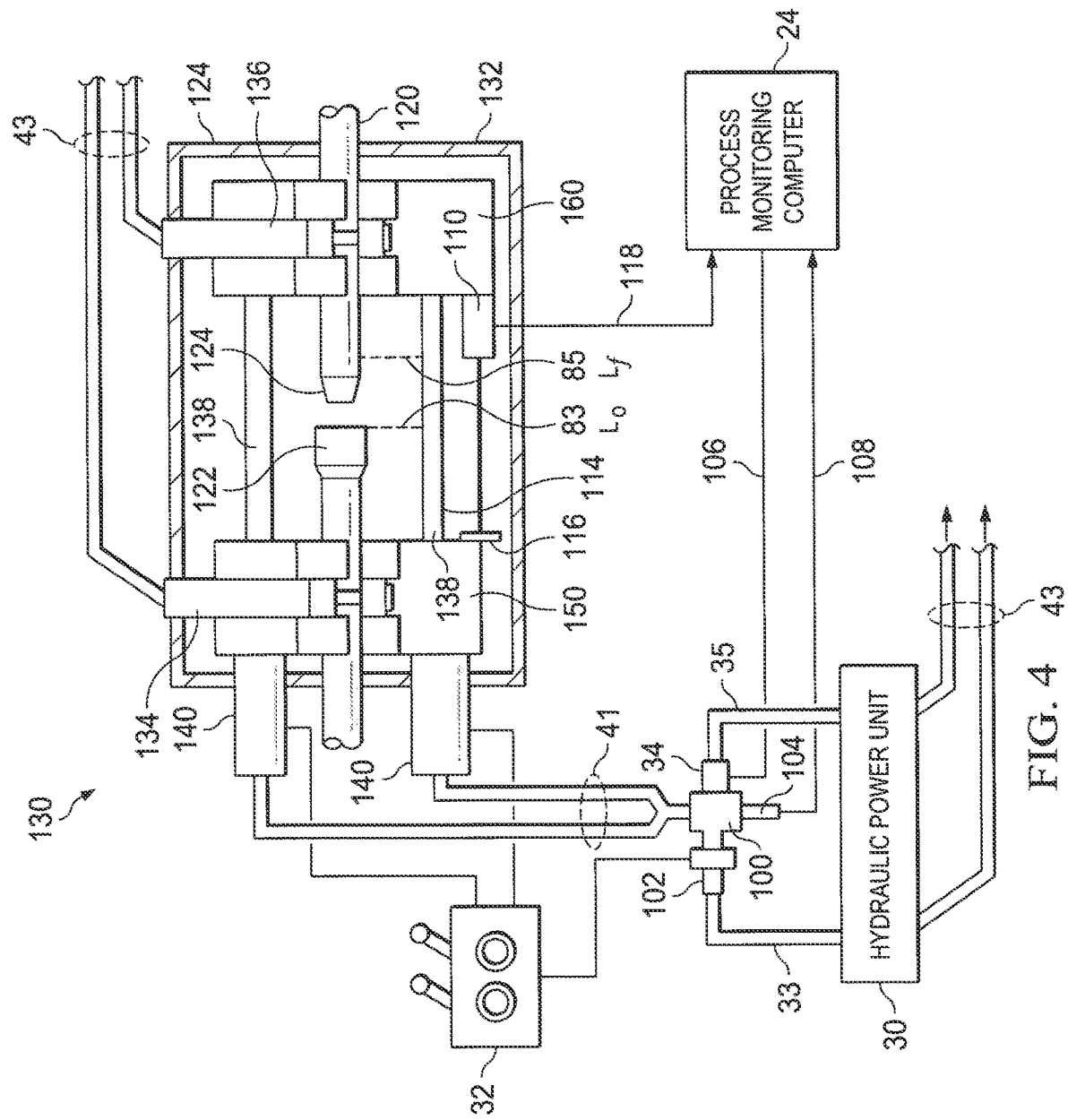
FIG. 4 illustrates a pictorial view of one embodiment of a pipe Assembly Machine for use in the embodiments of FIGS. 1 and 2.

FIG. 4 illustrates a top side pictorial view of one embodiment of a pipe Assembly Machine for use in the embodiments of FIGS. 1 and 2. The assembly machine 70, supported by base 132, is configured to form a mechanical press-fit pipe joint between first and second sections of pipe to form a pipeline, as depicted in FIG. 13 to be described. In this example, the box end 122 of the first section of pipe 120 is clamped in the jaws of a pipe clamp 150 that is secured to the base 132. The pin end 124 of the second section of pipe 126 is clamped in the jaws of a sliding pipe clamp 160. The secured pipe clamp 150 is operated by a hydraulic cylinder 134. The sliding pipe clamp 160 is operated by a hydraulic cylinder 136. The sliding pipe clamp 160 travels along the pair of rails 138 as they are drawn toward the secured pipe clamp 150 by the hydraulic cylinders 140. The hydraulic cylinders 140 are powered by the hydraulic lines 41 that are connected to the junction block 100. Similarly, the hydraulic cylinders 134, 136 for operating the pipe clamps 150, 160 are supplied hydraulic fluid from the hydraulic power unit 30 via lines 43.

The remaining structures of FIG. 4 are identical structurally and functionally with the respective components of FIG. 3.

Description of the Mechanical Press-Fit Processes

Figure 5B:
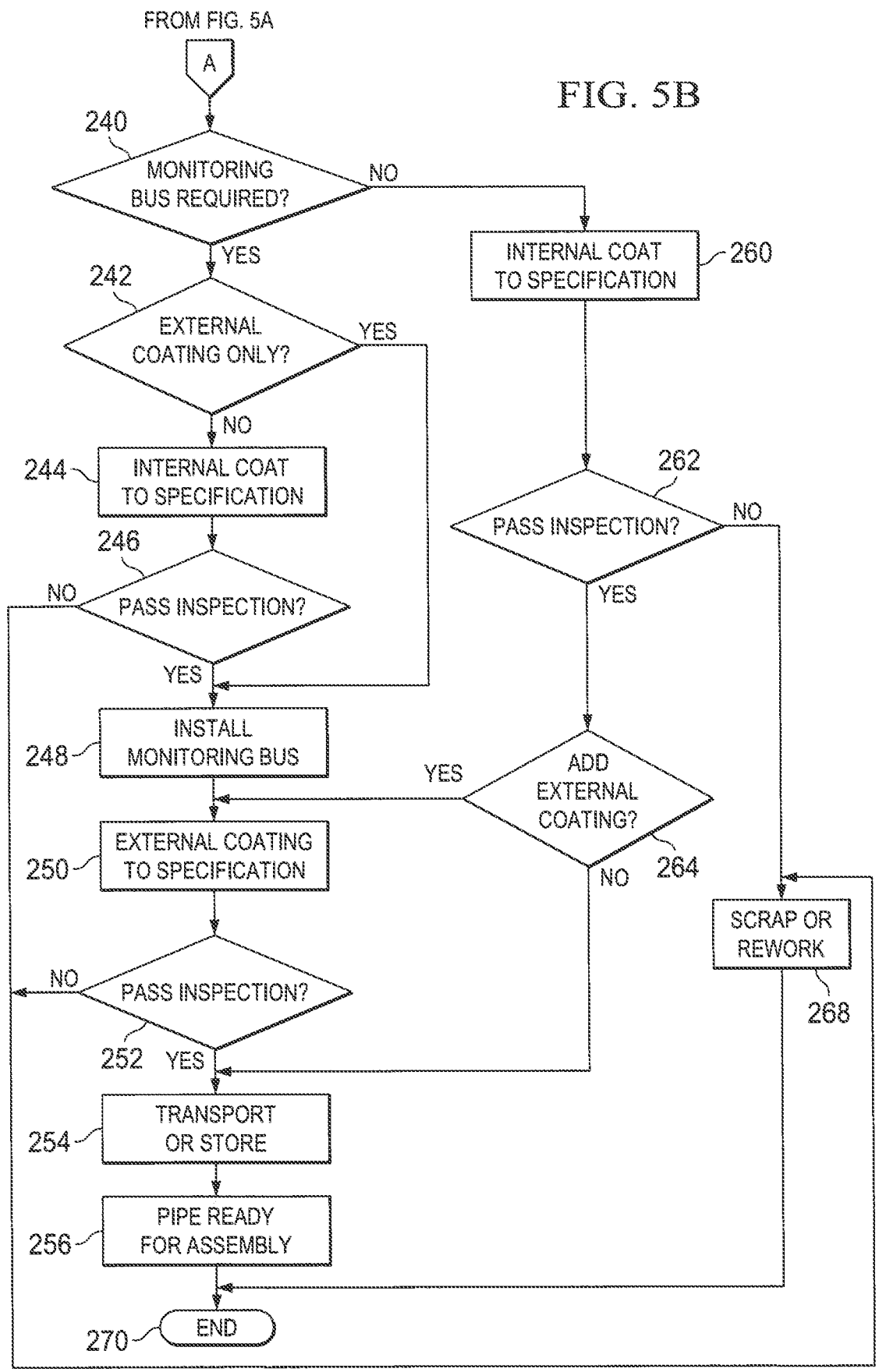
FIG. 5B illustrates a second section of one embodiment of a flow chart directed to the processes of preparing the Box end and Pin end of the pipe for assembly to construct a pipeline.

FIGS. 5A and 5B illustrate one embodiment of a flow chart directed to the processes of preparing the Box end and Pin end of the pipe for assembly to construct a pipeline. The initial steps, called "pre-prep" include cleaning and machine operations designed to condition the pipe surfaces and provide a uniform finish on the surfaces of the pipe ends to ensure a secure and liquid tight mechanical joint free of voids and "holidays" (gaps), scratches and uneven surfaces that would impair the intimate metal-to-metal contact between the joined surfaces. These pre-prep steps may include the application of certain lubricants and corrosion inhibitors to be described to facilitate the pre-prep process in forming a consistent, uniform, finished surface to minimize "holidays" (gaps, scratches, voids, etc. in the surface of the pipe), prevent corrosion, and protect the surfaces from damage. The objective is two-fold: (a) to ensure a secure and leak-proof joint; and (b) to ensure the repeatability of measurements made during and after preparation and assembly of the mechanical press-fit pipe joints.

The pre-prep steps of FIG. 5A may also include sand blasting or honing (or alternately, wire brushing) to remove corrosion (and provide a bare metal or "white metal" finish) and the use of certain tools such as cutting or grinding tools for cutting or grinding portions of the pipe end to a specified profile, and for finishing or smoothing the surfaces in preparation for an application of certain substances to clean or prepare a joint surface for making the joint. As is well understood in the art, the operations of honing and wire brushing may include the use of honing or cutting oils to facilitate the operation, extend the life of the honing tool (if used), and flush the debris removed by the operation away from the cleaned surface. The surface finish required is in the range of "roughness average" $R_a$=1 to 3 mil (i.e., 0.001 to 0.003 inch). $R_a$ is defined as the average of the peak roughness variations above the mean value. A similar parameter of measurement may be expressed as the RMS or root-mean-square value of the peak deviations in the surface profile.

Following the cleaning operations, the application of corrosion inhibitors may be preferred. Corrosion inhibitors of two types may be used; one is solvent based, the other is mineral oil based. Each may be selected to suit a particular set of conditions of the pipe segment and subsequent process steps, environmental conditions, etc. For example, while the solvent-based corrosion inhibitors do not require an extra step to remove them prior to coating or other operations, the oil-based corrosion inhibitors generally require a light spray coating of a cleaning fluid just prior to the end-forming processes in the swedging machine operations as described below using the machines depicted in FIGS. 3 and 4. Corrosion inhibitors may also have "dewatering" properties, i.e, the ability to shed water as a means of retarding new corrosive processes of the "white metal" surfaces.

Proceeding with FIG. 5A, the flow begins at step 200 and advances to step 202 to begin pre-preparation processing of the pipe ends for preparation to be joined. Step 202 may include delivery and sorting of the raw pipe to an inspection site. Next, step 204 includes visual inspection of the ends to be prepared, followed by step 206 for selecting the pin end of the section of pipe for a machine beveling operation in step 208. The machine beveling operation will produce an outward bevel profile 626 ("bevel 626") at the edge of the pin end of the pipe. The bevel amount is typically set to approximately 8 degrees relative to the longitudinal axis of the pipe and may extend for approximately 1.00 inch along the inner surface of the pin end of the pipe. These figures are typical for nominal, medium pipe sizes (e.g., with O.D. in the 6 to 8 inch range). For pipe of smaller or larger O.D. it may be necessary to adjust the values of this bevel profile. The bevel 626 provides a taper that slightly expands the inside diameter of the pin end of the pipe at the edge of the pipe end so that when a pin end is mated within a box end, the internal edge of the formed MPF joint presents minimal obstruction to the flow of fluids within the assembled pipeline. The bevel or taper 626 applied to the inside surface of the pin end, extending for a short distance along the inner surface of the pin end also forms one-half of a "double taper" configuration of the mechanical pipe joint. This configuration, with a first taper of the outer diameter of the pin end and a second taper along a short portion of the inner end approximates a seamless joint that is smooth both inside and outside the pipe. See FIGS. 12 and 13.

Considering further the flow chart of FIG. 5A, both the box and pin ends are then passed to the cleaning step 210, which may include honing and bristle brushing the surfaces of the ends using lubricants such as a honing oil doped with a high load bearing lubricant ("HLBL"), primarily to extend the life of the honing tools. The cleaning process may be followed by application of a solvent or mineral oil—based corrosion inhibitor, and protective coatings or sealants well-known in the industry, in the following step 212, the fully prepped pipe sections may be loaded into an end prep 70 machine (See FIG. 3) to form a box end or pin end. The process of forming the box and pin ends of step 212 is further described below in the description of FIGS. 6A through 6C beginning with step 306. When the pipe section is secured into the pipe clamp 90, and the box end die 600 or pin end die 610 (See FIGS. 11 and 12 respectively) is secured in the sliding stock of the end prep machine 70, the reference point or datum 83 for initiating the forming of the box 504 or pin 506 end may be established in step 214. After the datum 83 is set (as described in the following paragraph), the hydraulic pressure may be applied to activate the end prep machine 70, and measurements of the hydraulic pressure P and the length L of the stroke required to fully form the box end 600 or pin end 610 may be made. These measurements, which are critical to verifying that a proper pipe end is formed, are recorded, and plotted on a graph 400 (See FIG. 7) for viewing by the operator of the end prep machine 70.

Setting the datum for P and L may be accomplished as follows. Once the pipe section 60 is secured within the pipe clamp 90 the free end of the gauge string 114 is extended from the string pot 110 (mounted on the fixed pipe clamp in this example) and attached to the post 116 mounted on the sliding stock 80 that holds the box 600 or pin 610 die in the mandrel 82. The sliding stock 80 is advanced along the rails 84 until the die 600 or 610 is within a predetermined distance of the pipe end. This distance, which may vary from zero to ¼ inch, for example, enables the string pot to be set to read zero inches at $L=L_0$. From this datum point, the length L being known as the objective will be reached when $L=L_f$ as shown in FIG. 3. This value of $L_f$ may be entered into the data record accumulated in a database as depicted in FIGS. 1 and 2.

It will be recalled that the traditional method of indicating the distance the box end should overlap the pin end was to inscribe—usually by hand—a mark on the pin end using chalk or other readily visible marker. Then, when the box end is forced over the pin end, the force is applied until the end of the box end reaches the mark on the pin end. Clearly this operation depends on skilled eye-hand coordination of the operator of the machine applying the force to the box end, as well as other operating conditions of the equipment, etc. It is inherently an unreliable method of joining pipe ends together, partly because of uncertain repeatability. Further, in the traditional method, no record of the distance—the amount of overlap of the box end over the adjoining pin end—was created, nor was the value of the length standardized or any process used to verify its accuracy or ensure its repeatability for the particular pipe segment undergoing the process. This lack of verification or repeatability information impairs the ability to determine the causes of mechanical pipe joint failures because there is no data to retrace the history of particular pipe joints. Without sufficient data about how pipe joints are prepared and assembled there is no reliable way to make the claim that a pipeline has been properly assembled and will withstand the operational, environmental, and geological conditions that it will experience during the life of the pipeline.

In the present invention, the distance from the end of the pin end to "the mark" is defined as the value of $L_f$ described in the foregoing. Thus, in operation, at the datum $L=L_0$ the hydraulic pressure may preferably set to its initial value, for example, $P=P_0=10$ psi as an example. The values of P and L having been set to their initial values, the hydraulic pressure may be increased gradually to cause the die 600, 610 installed in the mandrel 82 to advance toward the end of the pipe to be formed. Since the OD of the pin end is intentionally slightly larger than the ID of the box end, an interference contact is established and considerable frictional resistance is encountered. This resistance opposes the increase in hydraulic pressure such that the rise in pressure P is plotted in curve 400 (See FIG. 7) versus the length of stroke L that is required to fully form the pipe joint. The fully formed pipe joint will generally have $P_f$ and $L_f$ values within the acceptance range 460 shown in FIG. 8 to be described.

Returning to FIG. 5A, following step 214, the flow advances to step 216 wherein the operator stops the machine when the correct values of P and L fall within the acceptance window formed by the maximum and minimum values of the parameters P and L as shown on the graph of FIG. 8. These values define the acceptance range or window 460 as will be described indicating a fully formed and in-spec mechanical press-fit pipe joint 620 as shown in FIG. 13. The pipe section may then be removed from the machine and inspected in step 218. If the pipe end does not pass inspection, the flow proceeds to a step 220 to consider whether to scrap the section of pipe or return it to step 200 for re-processing. If the section of pipe passes the inspection, then the flow may proceed through step 222 that provides for marking the pipe section with a permanent label so that the individual section of pipe may be tracked during monitoring and the data accumulated may be retrieved and stored in a database for later analysis.

The marking step 222 may be accomplished by a variety of methods. The preferred method for the illustrated example is to etch, inscribe, or stamp into the metal surface a numeric code or serial number, including certain specific data, as expressed in alpha-numeric form or encoded as a bar code, which may preferably be a two-dimensional bar code. One exemplary type of two-dimensional data matrix bar code, applied by a dot peening process, is available from Mecco Partners, LLC, Cranberry Township, Pa. 16066. Such codes can be read by industrial bar code readers such as are available from Cognex Corporation, Natick, Mass. 01760. The encoded data may include the location of the manufacturing plant, the date and time the pipe end was formed, the type end (box or pin), Mil specification data, etc. This data may be combined with the P and L data obtained during the end preparation forming process in a data record established for each section of pipe. The data record may further be supplemented by assembly data at the pipeline site, where the parameters P and L are again measured and stored in the data record as will be described herein.

Decision step 224, following step 222 is provided to determine whether the pipe section 60 must be coated or undergo the installation of a monitoring bus conduit or whether it is to be transferred to storage or prepared for transport in step 226. If the pipe section is to be coated, such as for corrosion protection, another decision point is entered at step 240 on FIG. 5B to decide whether a monitoring bus is to be installed on the pipe section as part of the process of the application of a coating. The monitoring bus may be a cable (aka, conduit), preferably equipped with connectors at each end, to be attached to the outer surface of the pipe section for connecting sensor elements and other circuitry for monitoring the condition of the pipeline as will be described with FIGS. 9 and 10.

Before continuing with the process depicted in FIGS. 5A and 5B of preparing the pipe ends for assembly, there are three alternative process steps that may involve coating the pipe sections before they are joined together. The coating steps to be described may occur at several times during the following processes. The steps may include interval or external coatings or both internal and external coatings of applying a coating, primarily as a corrosion inhibitor. In general, the process may include applying a coating of solvent-based or mineral oil based corrosion inhibitor. Alternatively, the process may include spraying a primer coating on the surface of the pipe followed by spraying a coating of liquid epoxy onto the primed surface.

In pipe lines that will not have a monitoring bus installed on the external surface of the pipe, only the internal surface of the pipe will normally be coated. If a monitoring bus is to be installed, the pipe segments will receive an external coating as part of the process of installing the monitoring bus. In other instances, both internal and external coating is required. Thus, FIG. 5B outlines the process steps for coating the pipe segments, including the installation of the monitoring bus if required. Following the decision step 224 in FIG. 5A, the flow advances to step 240 to decide whether a monitoring bus is to be installed. If YES, the flow proceeds to step 242 to determine whether the pipe section is to receive only an external coating. If NO, the process advances to step 244 to go through the internal coating process according to the applicable specifications. After coating the coated pipe section (or segment) is inspected, and if it passes the flow proceeds to step 248 to install the monitoring bus on the pipe section by attaching it to the external surface of the pipe section. If the coated pipe section did not pass inspection it is transferred to a scrap or rework operation in process step 268 for disposition.

In step 248, the monitoring bus may be attached to the external surface of the pipe section by means well known in the art, and disposed such that the connectors at each end of a monitoring bus segment are accessible to be joined together across the press-fit pipe joint after assembly of the pipe sections end-to-end to form the pipeline. Following installation of the monitoring bus, the section of pipe passes through the external coating process to the applicable specification in step 250. If the external coating passes inspection in step 252, the pipe section, complete with the monitoring bus and the external coating, is transferred to step 254 for transport or storage to await the assembly of the pipe section into a pipeline.

Returning to step 240 of FIG. 5B, if it is not required to install a monitoring bus on the subject section of pipe, the flow enters a process to apply an internal coating to the pipe section, again according to the applicable specification. This stage may be the same coating line as in step 244 or it may be a separate coating line, perhaps even at a different plant facility. If the coated pipe passes inspection in step 262, the pipe advances to a decision step 264 to determine whether the pipe section, already coated internally is also to receive an external coating. If YES, the flow proceeds to the step 250 to be coated externally to the applicable specification. Again, this coating process may be performed at a separate coating facility, depending on the particular process sequence adapted by the processor. Subsequently, the pipe may undergo the same process steps 252, 254, 256 and 270, or 252, 268 as described previously. Returning to step 264, if the decision is NO, the process follows the path to steps 254, 256, and 270 as described. At step 270 the processes for preparing the ends of the section of pipe, i.e., the box end and pin end of each section of pipe, are completed and the pipe is ready for assembly at the pipeline site.

The coating materials used in the processes illustrated in FIGS. 5A and 5B include the application of corrosion inhibitors (see step 210) as described, and applying a coating of an epoxy material—or, alternatively, a methyl methacrylate adhesive ("MMA")—in steps 244, 250 or 260 provided as a filler or sealant, and as an adhesive to ensure a leak-free mechanical press-fit pipe joint. The honing or wire brushing step described previously (step 210) is needed to provide a surface roughness that is optimized for maximum adhesion of the epoxy or MMA material. The internal coating may be an epoxy paint that is sprayed on or a fusion bonded epoxy ("FBE") coating applied as a powder to the interior surface of a pre-heated pipe section. The heat melts the powder to form a smooth, void-free coating. The coating operation may include masking a portion of the pipe section. The external coating may also be an FBE coating applied to the exterior of the pipe section. The coating steps may include installation of a plastic protective cap over the finished box or pin end when coating is completed. An additional coating of the pin end of each pipe section is will described with FIG. 14.

Figure 6A:
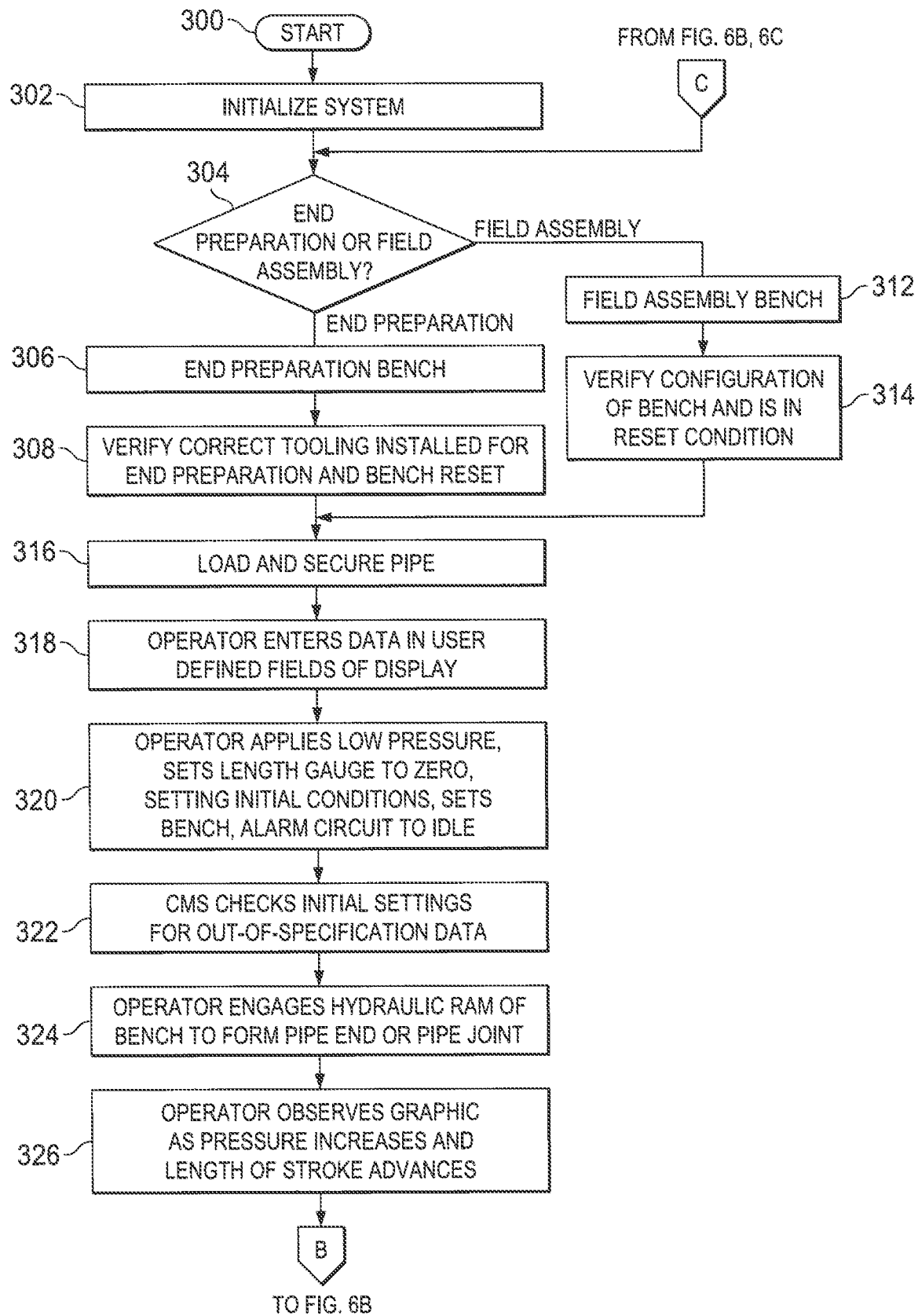
FIG. 6A illustrates a first section of one embodiment of a flow chart directed to operating the End Preparation and Assembly Machines of the embodiments of FIGS. 3 and 4 for the measurement of key parameters involved in forming the Box end and Pin end of the pipe sections and the assembly of the Box End and Pin end together to construct a pipeline.
Figure 6B:
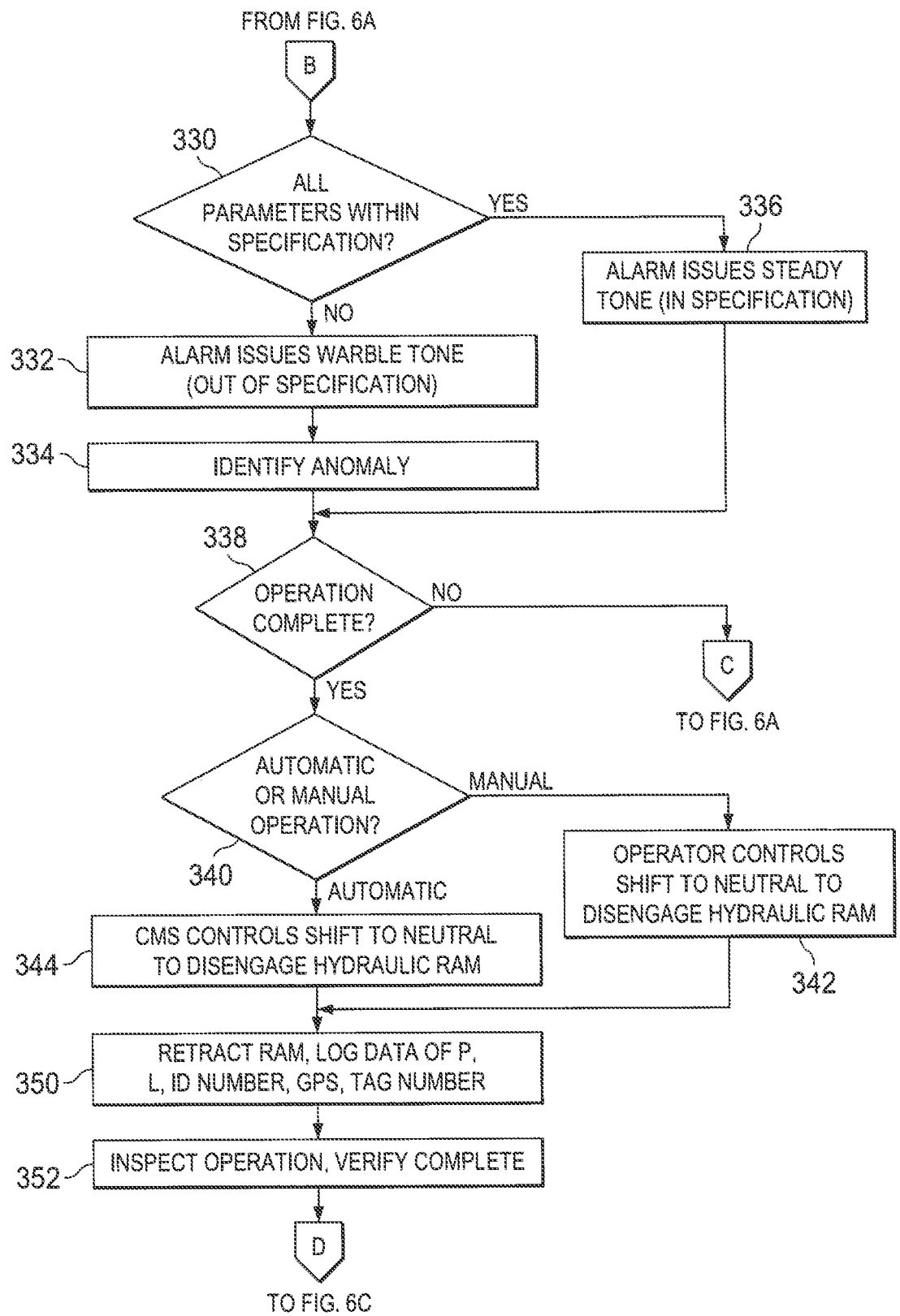
FIG. 6B illustrates a second section of the embodiment of FIG. 6A.
Figure 6C:
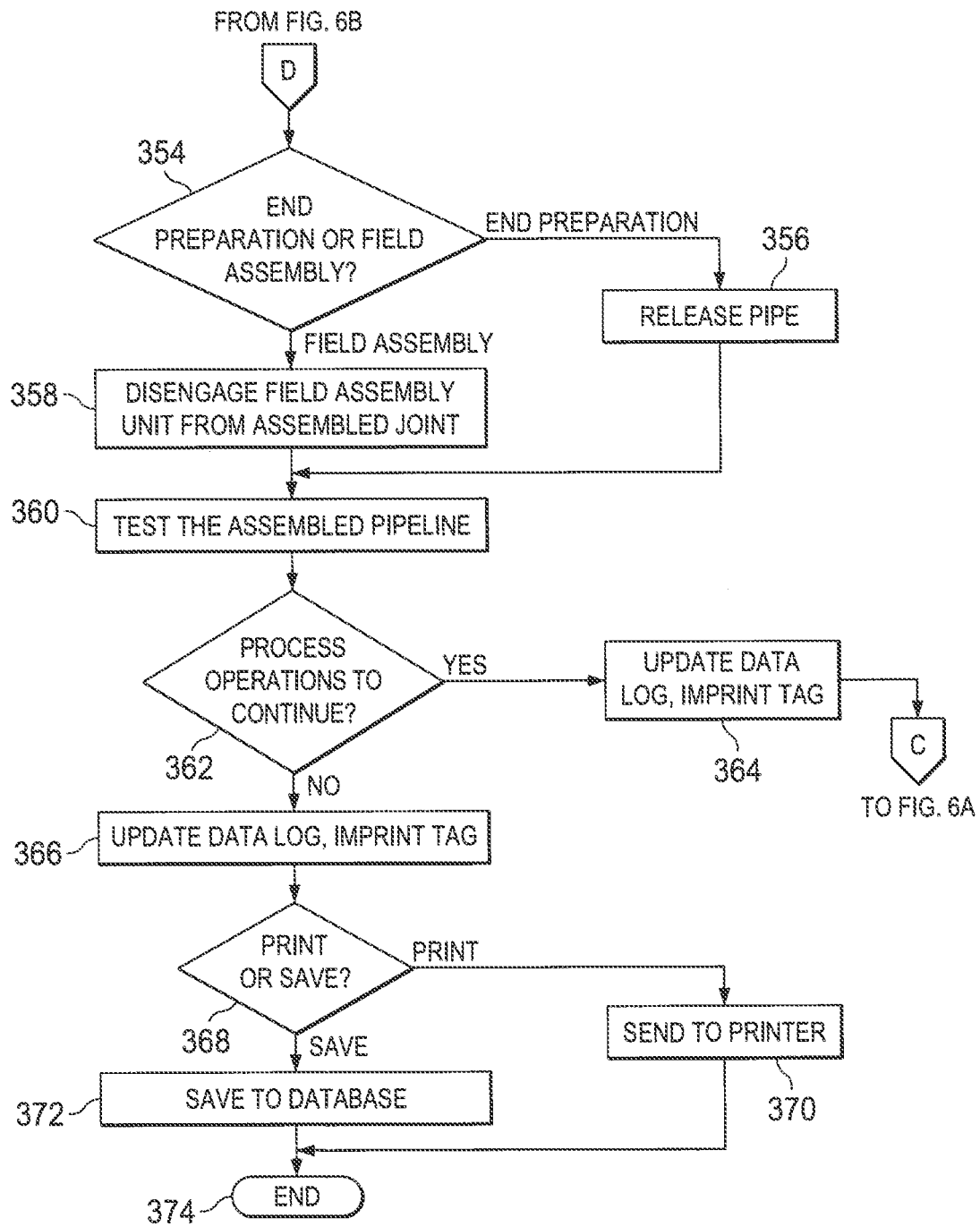
FIG. 6C illustrates a third section of the embodiment of FIGS. 6A and 6B.

FIGS. 6A, 6B, and 6C illustrate one embodiment of a flow chart directed to operating the End Preparation and Assembly Machines of the embodiments of FIGS. 3 and 4. The End Prep and Assembly machines are basically variations of a swedging (aka swaging) machines operated under hydraulic pressure provided by a high capacity hydraulic pump, typically driven by a diesel engine. These operations include as essential steps the measurement of key parameters involved in forming the Box end and Pin end of the pipe sections and the assembly of the Box End and Pin end together to construct a pipeline. The flow starts at step 300, followed by initializing the system at step 302 and a step 304 to determine whether the process is set up for either (a) end preparation or (b) field assembly. It will be appreciated that the invention has been devised to utilize very similar sequences of operations in both phases (a) and (b) of providing for reliable mechanically press-fit pipe joints. It should also be appreciated that both phases (a) and (b) include the measurement steps described herein for measuring and recording the parameters P and L, a key step in the respective processes.

The dual sequences (a) and (b) are depicted in FIGS. 6A through 6B. If the process is to enter the "end preparation" path, the flow advances to step 306 to install a first end of the pipe segment in the end preparation bench and, in step 308, verify that the correct tooling is installed and the bench is reset to an initial condition. Similarly, if the process is to enter the "field assembly" path, the flow advances to step 312 to install a first end of the pipe segment in the field assembly bench and, in step 314, verify that the correct tooling is installed and the bench is reset to an initial condition. It will be recalled from the description of FIGS. 3 and 4 herein above, that the end preparation and field assembly benches are quite similar in configuration and operation. In the case of the end preparation operation, both ends of a section of pipe, typically 40 feet long, may be prepared simultaneously using separate machines because the process steps employ identical steps. Thus an end prep machine set up to prepare and form a pin end operates on that end of the pipe section while an end prep machine set up to prepare and form a box end operates on that end of the pipe section at the same time, each end prepared by a separate crew to load, secure, and perform the required processes.

Following Step 316, the process follows the same steps whether forming the pipe ends or assembling box-to-pin end to form a mechanical press-fit pipe joint. Thus, upon loading and securing the pipe section in the end prep bench in step 316, the flow advances to step 318 where the operator enters data about the pipe section in defined areas of the graphical display (see FIG. 7). This data, which will be encoded in the permanent tag or label 508 (See FIG. 9) may include but not be limited to the date, the location (perhaps coded, or expressed in longitude and latitude coordinates) of the facility, the operator ID, serial number of the pipe section, and pipe data such as its material and dimensions. In the next step 320, the operator sets the machine to an initial condition by applying low pressure to advance the moving die to a reference, setting the P and L datum points, for example, to $P=P_0=10$ Psi and $L=L_0=$zero inches (0 in.) and recording these datum points on the graphical display. Further in step 320 the operator sets the bench and the alarm circuit to idle. The alarm circuit may be configured to operate when the hydraulic pressure conditions fall outside acceptable values, which may result in triggering the dump valve 34 (See FIG. 2) and illuminate a warning light 444. The conditions for triggering the dump valve 34 are described below with FIG. 8. In step 322, the computer monitoring system ("CMS"), also known as the process monitoring computer 24 herein, checks that the initial settings for P and L are within specification before engaging the machine.

In step 324, the operator engages the hydraulic ram, typically by moving a lever or operating a switch on the control panel 32 (See FIGS. 3 and 4) to form the respective pin or box end, or to assemble a press-fit pie joint. As the hydraulic pressure P and the stroke length L increase, the operator in step 326 observes the values plotted in real time on the graphic screen (See FIG. 7) on the display 26 (See FIGS. 1 and 2) and notes whether, in step 330 in FIG. 6B, all parameters are within specification. If a parameter is out of specification at any point, particularly as the end prep or the joint approaches completion, an alarm signal may be activated, which may be an indicator light (Reference No. 444 in FIG. 7) or an audible tone. This step will be further described with the aid of FIG. 8. If an audible tone is used, a warble modulation or flashing light is preferred to indicate an out-of-specification parameter. This is especially important if the parameter P is excessive. Upon noting the alarm condition, the operator in step 334 may shut down the machine, identify the anomaly, and take appropriate corrective action. If the operation is not completed satisfactorily the process in this example returns to step 304 per step 338. If the operation is completed to specification, the flow advances from step 338 to step 340.

Steps 340-344 are an interim or alternative sequence to cover as alternative embodiments the manual or automatic operation of the swaging machines 70, 130 in response to the activation of an alarm condition. If manual operation is preferred, the flow proceeds to step 342 to enable the operator to control the shift of the machine to a neutral condition to disengage the hydraulic rain of the swaging machine 70 or 130. If automatic operation is preferred, the CMS 24 (aka the process monitoring computer 24) shifts the machine to neutral to disengage the hydraulic ram and stop the machine.

When the hydraulic ram is disengaged and retracted in step 350, the process monitoring computer 24 logs the data of the parameters $P_f$ and $L_f$ along with the ID number, GPS coordinates, tag number, etc. before proceeding the step 352 to undergo the inspection of the completed pipe end or pipe joint. Upon verification in step 352 the flow advances to step 354. If the process is forming a pipe end (box or pin) the pipe section may be released in step 356 and proceed to step 360. If the process is forming a pipe joint during field assembly, the field assembly machine (FIG. 4) is disengaged from the assembled mechanical press-fit joint in step 358 and moved to the next joint location.

Upon completion of the pipeline assembly, the pipeline is preferably tested in step 360 to confirm its functional utility and integrity. The testing may at a minimum comprise the steps of performing electrical and data signal tests of the pipeline data monitoring system; performing a pressure test of the installed pipeline for leaks and flow volume; and attaching ultrasound test apparatus to the pipeline for acoustic testing for leaks and flow turbulence. While such tests are well-known in the industry and not always carried out in practice, they are essential to the operation of a pipeline constructed according to the principles described herein, to ensure an adequate data record for each joint of the pipeline.

If the respective process operations are to continue, per step 362, the data log is updated and the pipe end tag—the permanent label discussed previously—is imprinted in step 364 before the process returns to step 304 in FIG. 6A. If the process operation is to be discontinued, the data log is updated and the pipe end tag is imprinted in step 366 followed by an option to print or save the updated log in step 368. If the data log is to be printed, the flow proceeds to step 370 followed by step 374, which is the end of the process depicted in FIGS. 6A through 6C. If the data log is to be saved, the flow proceeds to step 372 to save to the database 42 (See FIGS. 1 and 2) followed by step 374.

FIG. 7 illustrates a screen shot of a graphical display that depicts data measured during operation of the embodiments of FIGS. 3, 4, 5A, 5B, 6A, 6B, and 6C. The screen includes a graphed plot 400 of the changes in the parameters P and L during the formation of a pipe end or the assembly of a mechanical press-fit pipe joint. Interpretation of the plot will be described in FIG. 8. The vertical axis 402 represents the hydraulic pressure P and the horizontal axis 404 represents the length L. The lines 406 and 408 represent respectively the maximum and minimum acceptable values of the hydraulic pressure P provided to the swaging machines 70, 130 during operation of the respective end prep and assembly processes. A table of identification data 410 is shown in the upper left hand corner of the display. A linear graph 420 may be provided as shown to display the numerical values 422 of the length parameter L, which is the displacement of the hydraulic ram during its operation. A pressure gauge 424 may be provided to display the numerical value of the hydraulic pressure P. Temperature gauges 428, 432 may be provided to display readings of the ambient air temperature 430 and the hydraulic fluid temperature 434 as sensed by temperature sensors located proximate the swaging machines. The temperatures may also be graphed to display their variation in graphical form on graphs 440 and 442 respectively as depicted in the upper right hand corner of the display. Also shown in FIG. 7 is an alarm indicator 444, which may include an image of a light next to the teen "Alarm." This feature may be included to facilitate alerting an operator of a condition during operation of the machine as described in FIG. 6B at steps 330 to 334.

FIG. 8 presents a detail view of an exemplary graphical plot 400 of the parameters P and L, including acceptance ranges of the parameters, to assist in interpreting the displayed graphical plot 400. The maximum and minimum values of the hydraulic pressure P is represented by the dashed horizontal lines 406 and 408 respectively. The maximum and minimum values of the length L is represented by the dashed vertical lines 450 and 452 respectively. These values enclose a rectangular 'window' of acceptance 460 for a finished process, whether it be a completed pipe end or an assembled pipe joint. The practical use of this 'window' 460 is to let the operator know when a completed process is within specification. It is particularly useful during manual operation of the machine. It will be appreciated that the values shown are exemplary; actual values may be different than those shown for illustration and not intended to be limiting. Also shown in FIG. 8 are angled lines delineating the preferred limits of the variation of P with L during operation of either end prep or assembly process. For example, the hydraulic pressure P should remain within the lines 454 and 456 for a normal process. If the plot 400 of hydraulic pressure P strays outside these limits at some point during the process, the indication is that the pipe end or joint being formed will contain a defect if the process is allowed to continue. These conditions may be associated with the alarm function to ensure that the operator is cognizant of the anomalous operation. The lines 462 and 464 are shown to suggest when a connection of a mechanical joint will be defective because either (462) the hydraulic pressure P is excessive at the associated value of the length L, or because the hydraulic pressure P is insufficient at the associated value of the length L.

Figure 9:
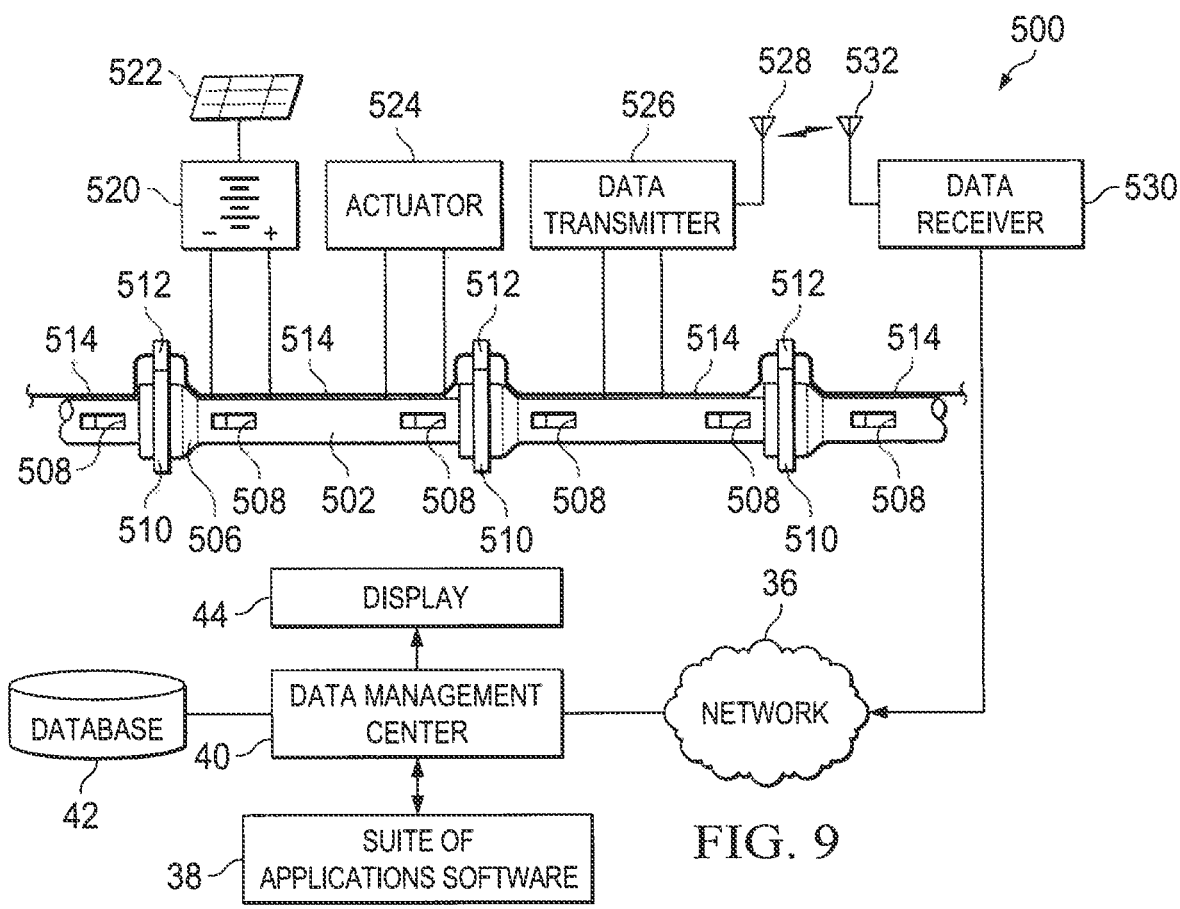
FIG. 9 illustrates one embodiment for monitoring the integrity of an assembled pipeline that utilizes pipe prepared according to the embodiments of FIGS. 1 through 8.

FIG. 9 illustrates one embodiment for monitoring the integrity of an assembled pipeline that utilizes pipe prepared according to the embodiments of FIGS. 1 through 8. A portion of an assembled pipeline 500 is shown including components of a pipeline monitoring apparatus attached to the pipeline 500. Sections 502 of pipe are joined at mechanical press-fit pipe joints formed of pin ends 504 and box ends 506. Each end of a section 502 of pipe is identified with a permanent tag 508 (such as the dot-peened tag previously described). Each assembled mechanical pipe joint includes a sensor circuit module 510 attached thereto. In the illustrated example, the sensor circuit module 510 may be a thin film circuit that includes sensing elements 550 through 556, interconnecting and processing circuits 512, 542, and transmitting circuits 526, 528 as shown in FIG. 10 to be described.

Also depicted in FIG. 9 is a monitoring bus 514 that may be attached to each respective portion of the pipeline 500 by means well known in the art, wherein the monitoring bus 514 is connected at each mechanical pipe joint by the connector 512 as shown. It will be appreciated that the pipeline shown is a representative functional example of the apparatus to illustrate one way the pipeline may be configured. The monitoring bus 514 may further include such components as a power supply 520—for example a rechargeable battery coupled to a solar powered recharging system—an actuator 524 for controlling operation of the monitoring bus system, a transmitter and antenna 526, 528 for communicating via a network 36 with a data management center 40 via the data receiver and antenna 530, 532. Data communicated to the data management center computer 40 may be processed by components of the suite of applications software 38 accessible from the data management center computer 40. The suite of applications software 38 includes the necessary storage facilities, which may be directly coupled to the data management center computer 40 or accessible via a network to remote storage facilities, as is well understood in the art. Installing the pipeline sensor circuit modules comprises securing a sensor circuit module 510 to the pipeline at each mechanical press-fit joint, connecting each module 510 to the pipeline monitoring bus 514, and connecting the power supply 520, actuator 524, and data transmitter 526 and its antenna 528 to the pipeline monitoring bus 514.

Figure 10:
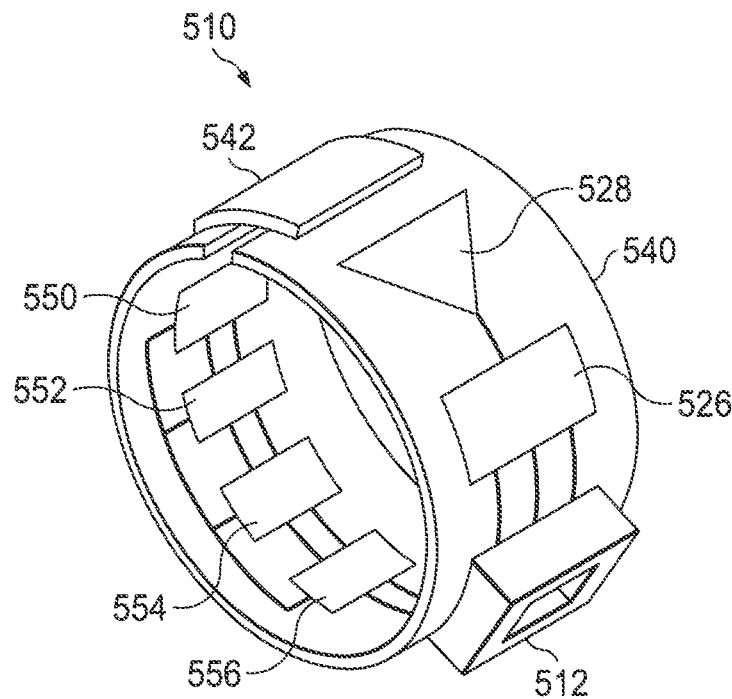
FIG. 10 illustrates one embodiment of a sensor circuit module for use in the embodiment of FIG. 9.

FIG. 10 illustrates one embodiment of a sensor circuit module for use in the embodiment of FIG. 9. In this illustrative embodiment the module 510 may be formed as a thin film circuit that includes sensing elements 550 through 554, processing circuit 556, and transmitting circuits 526, 528 as shown. En the illustrated example, a temperature sensor (for example, a thermocouple) 550, an acoustic sensor (such as a piezoelectric element) 552, a strain gauge (which may also be a piezoelectric element), and integrated circuitry that may include a processor, memory, data acquisition, and communication interface sections. These circuit elements and sensors may be coupled together and configured to output data to a transmitter and antenna for sending the data to a pipeline data acquisition 20 location for connection via a network 36 to a data management center 40 as shown in FIG. 1. A bus connector 512 may be provided for connection to the pipeline monitoring bus 514. A connector 542 may be provided for securing the thin film module 510 to each mechanical press-fit pipe joint. The sensor module 510 is preferably secured around the midpoint of the press-fit joint 620 (See FIG. 13) where the mating component of bus connector 512 is located.

FIG. 11 illustrates a cross section view of a die 600 for forming the box or bell end of a section of metal pipe. The cross section is provided to show that the internal diameter of the box or bell end to be formed by the die is to be slightly tapered at an angle of 4 degrees at the forward or nose end of the die and at an intermediate angle of 2 degrees between the forward or nose end and the nominal diameter of the tail end of the die, which corresponds to the outside diameter of the pipe to be formed.

FIG. 12 illustrates a cross section view of a die 601 for forming the pin or cone end of a section of metal pipe. The cross section is provided to show that the external diameter of the pin or cone end to be formed by the die is to be slightly tapered at an angle of 5 degrees at the forward or nose end of the die and at an intermediate angle of 2 degrees between the forward or nose end and the nominal diameter of the tail end of the die, which corresponds to the outside diameter of the pipe to be formed. During assembly of a MPF joint a pin end formed by the die of FIG. 12 is inserted under hydraulic pressure as described previously into the box end of a pipe section formed by the die of FIG. 11. As the pin end enters the box end, metal-to-metal contact will be made and become more pronounced as the nose of the pin end approaches the nominal inside diameter of the pipe. The outer surface of the pin end and the inner surface of the box end will be in 100% contact through the length of the joint and around the circumference of the pipe sections in a completed MPF joint. FIG. 13 illustrates a cross section view of an assembled mechanical press-fit pipe joint 620 formed according to the present invention, with the pin end 504 fully inserted into and its outer surface in 100% contact with the inner surface of box end 506 throughout the full length of the MPF joint. Also shown in FIG. 13 is the effect of beveling the inside edge 622 of the pin end as described during the preparation process (See FIG. 5A, step 208 and its accompanying description). The purpose of this beveled edge 622 is to smooth the transition between the pin end and box end of the finished MPF joint.

Figure 14:
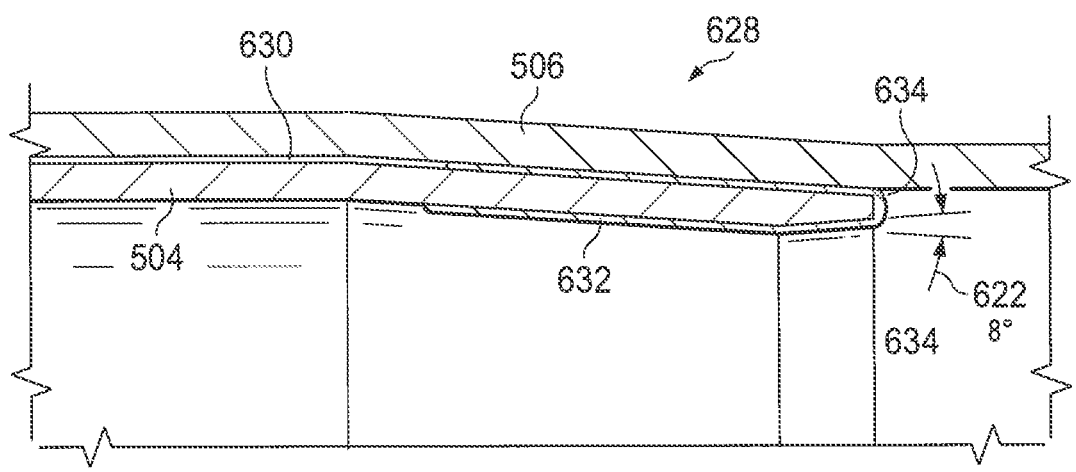
FIG. 14 illustrates a detail cross section view of an alternate embodiment to the mechanical press-fit pipe joint depicted in FIG. 13.

FIG. 14 illustrates a detail cross section view of an alternate embodiment to the mechanical press-fit pipe joint depicted in FIG. 13. In this embodiment of MPF joint 628 an FBE epoxy material or a methyl methacrylate adhesive ("MMA") coating 632 is shown. The coating 632 is applied to the formed and prepared pin end just prior to assembly of the MPF joint of a pipeline. The epoxy material preferably forms a fillet 634 at the nose of the pin end to smooth the transition of the pipeline interior at the MPF joint. This coating also may function to ensure additional adhesion and sealing of the joint. The space 630 may represent an external coating of the pin end 504 or an internal coating of the box end 506. The bevel feature of the pin end 622 is also shown in FIG. 14. The angle of the bevel feature may preferably be approximately 8 degrees and extend along the inner surface of the pin end from the edge at its end approximately 1.00 inch. The angles give in the foregoing exemplary description are intended to be illustrative and not limiting because they will vary with the particular dimensions of the pipe and the specific circumstances of its use.

CONCLUSION

Disclosed herein are systems and methods concerning construction of pipelines in at least four aspects including (1) the preparation of sections of pipe to be joined by mechanical, press-fit joints; (2) the assembly of such sections of pipe; wherein the processes involved are monitored by a computer programmed to measure and display to an operator in real time parameters that indicate the quality of the pipe ends being formed and the mechanical press-fit joints when being assembled. The data is accumulated and sent to a data management center for archival and analysis purposes to provide source material for the development of standards for the construction, maintenance, and security of installed pipelines. (3) The sections of pipe formed and assembled by the system and methods of the present invention include the components of a pipeline integrity system that measures and monitors conditions of the installed pipeline such as stresses due to geological and climatological variations, as well as internal pressures and temperature associated with the use of the pipeline to transport fluid commodities over long distances. (4) This data accumulated is likewise sent to the data management center to be stored and made available for analysis and maintenance. The data management center can monitor all data received and determine when an emergency occurs that arise from leaks or stresses experienced by the pipeline.

While the inventions have been shown in exemplary forms, they are not thus limited but are susceptible to various changes and modifications without departing from the spirit thereof. For example, the data processing systems, apparatus, and methods described herein are adaptable to data monitoring and processing of other types of pipeline structures. The data sensing and monitoring apparatus and methods are likewise adaptable with little modification to other types of pipeline structures. Various parameters of pipe characteristics may be monitored using the same concepts disclosed in the foregoing descriptions. The processes for preparing the metal surfaces disclosed herein may be modified as to technique and materials used without departing from the concepts applied in preparing pipe materials for undergoing the forming operations depicted and described herein. Further, the hydraulic machines used in forming the mechanical press-fit pipe ends can be used to form any pipe end and for other methods of joining pipe sections together.

Sections to be welded may have their ends "belled" to fit over an internal sleeve, as in a pipe joint to be welded, for example.

What is claimed is:

1. An apparatus for joining pipe section ends using a mechanical press-ft joint to form an oil and gas pipeline, comprising:
   a bench having a fixed stock at a first end configured with a clamp to hold a formed end of a first pipe section, and a movable stock slidingly supported on a second end of the bench, the movable stock coupled to a source of hydraulic pressure and configured with a clamp to hold a formed end of a second pipe section;
   a hydraulic pressure sensor coupled to the source of hydraulic pressure for measuring hydraulic pressure P applied to move the movable stock and the second pipe section clamped therein to engage the formed end of the second pipe section with the formed end of the first pipe section held in the fixed stock;
   a linear displacement sensor coupled between a fixed reference on the bench and the movable stock for measuring the linear displacement L of the movable stock when moving toward the fixed stock;
   a processor for acquiring and processing the sensor measurements P and L for display to an operator during joining of the first and second pipe sections; and
   a display coupled to the processor for displaying a graph of the sensor measurements P versus L to indicate in real time within a defined acceptance window plotted on the graph the correct formation of the mechanical press-fit joint between the first and second pipe sections; wherein
   a correctly formed mechanical press-fit joint assembled without inserting the pipe ends into a separate coupling device is indicated when both P and L appear within the acceptance window of the graph.

2. The apparatus of claim 1, wherein:
   the acceptance window is defined by predetermined minimum and maximum values of the sensor measurements P and L for the first and second pipe sections.

3. The apparatus of claim 1, wherein the processor comprises:
   a data acquisition unit coupled to the hydraulic pressure sensor and the linear displacement sensor for receiving and converting outputs of the pressure and displacement sensors to digital form; and
   a computer coupled to an output of the data acquisition unit and configured for measuring, under control of a program stored in a non-volatile memory, the hydraulic pressure P and the linear displacement L of the die occurring while forming the mechanical press-fit joint in the bench.

4. The apparatus of claim 1, wherein the display comprises:
   a screen image produced by the processor for displaying at least identification data and a graph of the hydraulic pressure P versus the linear displacement L during operation of the bench.

5. The apparatus of claim 1, wherein the processor further comprises:
   a process program stored in the non-volatile memory and configured for displaying in real time the measured hydraulic pressure P versus the linear displacement L in graphical form on the display while forming the mechanical press-fit joint.

6. The apparatus of claim 1, further comprising:
   a communications interface operatively connected to an output of the processor for linking the processor via a communications network to a remote data management center computer.

7. The apparatus of claim 1, further comprising:
   a source of hydraulic pressure provided by a hydraulic pump powered by an internal combustion engine.

8. The apparatus of claim 1, wherein the hydraulic pressure sensor comprises:
   a pressure gauge connected to a hydraulic feed line coupled between the source of hydraulic pressure and the movable stock on the bench.

9. The apparatus of claim 1, wherein the linear displacement sensor comprises:
   a displacement measuring device selected from the group consisting of a string potentiometer, a measuring tape, and a laser rangefinder.

10. An apparatus for assembling pipe section ends for an oil and gas pipeline to be joined by mechanical press-fit joints, comprising:
    a bench having a fixed stock at a first end configured with a clamp to secure a first end of a first pipe section having a formed end, and a movable stock slidingly supported on a second end of the bench, the movable stock coupled to a source of hydraulic pressure and configured with a clamp to secure a formed end of a second pipe section for assembly of the second formed end to the first pipe section;
    a hydraulic pressure sensor coupled to the source of hydraulic pressure for measuring hydraulic pressure P applied to move the movable stock and the second pipe section clamped therein toward the corresponding end of the first pipe section secured in the fixed stock;
    a linear displacement sensor coupled between a fixed reference on the bench and the movable stock for measuring the linear displacement L of the movable stock when moving toward the fixed stock; and
    a display configured to monitor when measurements of the hydraulic pressure P and the linear displacement L are both within a defined acceptance window plotted on the display; wherein
    the mechanical press-fit joint is formed without the use of a separate coupling device.

11. The apparatus of claim 10, wherein:
    the formed end of the first pipe section is a pin end of the first pipe section; and
    the formed end of the second pipe section is a box end of the second pipe section.

12. The apparatus of claim 10, comprising:
    a computer including a non-volatile memory, coupled to an output of the data acquisition unit and configured for acquiring, under control of a program stored in the memory, the hydraulic pressure P and the displacement length L occurring while joining the formed ends of the first and second pipe sections together.

13. The apparatus of claim 12, wherein the computer further comprises:
    a process program stored in the non-volatile memory and configured for controlling the display of the measured hydraulic pressure P and the displacement length L in graphical form on a display coupled to the processor while assembling the pipe sections.

14. The apparatus of claim 10, further comprising:
a communications interface operatively connected to an output of the computer for linking the computer via a communications network to a remote data management center computer.

15. The apparatus of claim 10, wherein further comprising:
a source of hydraulic pressure provided by a hydraulic pump powered by an internal combustion engine.

16. The apparatus of claim 10, wherein the hydraulic pressure sensor comprises:
a pressure gauge connected to a hydraulic feed line coupled between the source of hydraulic pressure and the movable stock on the bench.

17. The apparatus of claim 10, wherein the stroke length sensor comprises:
a displacement measuring device selected from the group consisting of a string potentiometer, a measuring tape, and a laser rangefinder.

* * * * *